(12) United States Patent
Kikkawa

(10) Patent No.: US 8,973,024 B2
(45) Date of Patent: Mar. 3, 2015

(54) VIDEO CONTROL APPARATUS AND CONTROL METHOD FOR VIDEO CONTROL APPARATUS

(75) Inventor: Teruki Kikkawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 380 days.

(21) Appl. No.: 13/001,853

(22) PCT Filed: Jul. 23, 2009

(86) PCT No.: PCT/JP2009/063539
§ 371 (c)(1),
(2), (4) Date: Dec. 29, 2010

(87) PCT Pub. No.: WO2010/018751
PCT Pub. Date: Feb. 18, 2010

(65) Prior Publication Data
US 2011/0113442 A1 May 12, 2011

(30) Foreign Application Priority Data

Aug. 13, 2008 (JP) .................................. 2008-208737
May 27, 2009 (JP) .................................. 2009-128061

(51) Int. Cl.
*H04N 7/16* (2011.01)
*H04N 21/4627* (2011.01)
(Continued)

(52) U.S. Cl.
CPC ........... *H04N 21/4627* (2013.01); *G09G 5/006* (2013.01); *H04N 21/4122* (2013.01);
(Continued)

(58) Field of Classification Search
USPC ..................... 725/25, 74, 109, 134
See application file for complete search history.

(56) References Cited

U.S. PATENT DOCUMENTS 7,734,098 B2 6/2010 Kikkawa et al.
7,755,653 B2 7/2010 Takamori
(Continued)

FOREIGN PATENT DOCUMENTS

EP 1761052 A2 3/2007
EP 1793602 A2 6/2007
(Continued)

OTHER PUBLICATIONS

Notification of Transmittal of the International Search Report and the Written Opinion of the International Search Authority issued in PCT/JP2009/063539, dated Sep. 29, 2009.
(Continued)

*Primary Examiner* — Jivka Rabovianski
(74) *Attorney, Agent, or Firm* — Fitzpatrick, Cella, Harper & Scinto

(57) ABSTRACT

Whether or not HDCP authentication is necessary is determined and managed for each device connected to an HDMI port. In selector control, when switching to an HDMI port to which is connected a video signal output apparatus that requires HDCP authentication, DDC access is turned off by setting an HPD signal to Low. Communication is then resumed after a predetermined amount of time has passed by setting the HPD signal to High and thereby turning the DDC access back on. When switching to an HDMI port to which is connected a video signal output apparatus that does not require HDCP authentication, the HPD signal is kept at High, and video and audio data is output without resuming the DDC access.

16 Claims, 17 Drawing Sheets

| CONNECTION PORT | PHYSICAL ADDRESS | LOGICAL ADDRESS | VENDOR ID | DEVICE TYPE | HDCP AUTHENTICATION |
|---|---|---|---|---|---|
| HDMI#A | [1. 0. 0. 0] | 1 | 000000(hex) | RECORDER | NECESSARY |
| HDMI#B | [2. 0. 0. 0] | 4 | 111111(hex) | PLAYER (DIGITAL VIDEO CAMERA) | UNNECESSARY |

(51) Int. Cl.
*G09G 5/00* (2006.01)
*H04N 21/41* (2011.01)
*H04N 21/4363* (2011.01)
*H04N 21/4367* (2011.01)
*H04N 21/443* (2011.01)

(52) U.S. Cl.
CPC ..... *H04N21/43632* (2013.01); *H04N 21/4367* (2013.01); *H04N 21/4436* (2013.01); *G09G 2370/04* (2013.01); *G09G 2370/047* (2013.01); *G09G 2370/12* (2013.01)
USPC ................ 725/25; 725/74; 725/109; 725/134

(56) References Cited

U.S. PATENT DOCUMENTS

| | | | |
|---|---|---|---|
| 2007/0274520 A1* | 11/2007 | Ogata | 380/201 |
| 2008/0120502 A1 | 5/2008 | Min | |
| 2008/0270635 A1* | 10/2008 | Nakahama | 710/8 |
| 2009/0138935 A1* | 5/2009 | Ohkita | 725/134 |
| 2009/0260043 A1 | 10/2009 | Tatsuta et al. | |

FOREIGN PATENT DOCUMENTS

| | | |
|---|---|---|
| JP | 2007-078980 | 3/2007 |
| JP | 2007-089013 | 4/2007 |
| JP | 2007-233960 | 9/2007 |
| JP | 2008-158208 | 7/2008 |
| KR | 20080037921 A | 5/2008 |
| WO | 2007037379 A1 | 4/2007 |

OTHER PUBLICATIONS

European Search Report issued in counterpart European Patent Application 09806645.9, dated Jul. 22, 2014.

AVSForum: "HDMI and HDCP—AVS Forum", AVS Forum website, Jan. 16, 2007, XP002726089, Retrieved from the internet: URL:http://www.avsforum.com/forum/168-hdmi-q-one-connector-world/787108-hdmi-hdcp.html (retrievied on Jun. 23, 2014) *Forum post of the poster "HDMI_Org" dated Jan. 16, 2007 (first line of the post:"Jan. 16, 2007, 02:07 PM . . . Post #7 of 15")*.

* cited by examiner

F I G. 5

| LOGICAL ADDRESS | DEVICE TYPE | VENDOR ID | HDCP AUTHENTICATION |
|---|---|---|---|
| 1, 2, 9 | RECORDER | UNSPECIFIED | NECESSARY |
| 3, 6, 7 | STB | UNSPECIFIED | NECESSARY |
| 4, 8 | PLAYER | 111111(hex) | UNNECESSARY |
| | | DIFFERENT FROM ABOVE | NECESSARY |
| 5 | AUDIO SYSTEM | DIFFERENT FROM ABOVE | NECESSARY |

FIG. 6

| CONNECTION PORT | PHYSICAL ADDRESS | LOGICAL ADDRESS | VENDOR ID | DEVICE TYPE | HDCP AUTHENTICATION |
|---|---|---|---|---|---|
| HDMI#A | [1. 0. 0. 0] | 1 | 000000(hex) | RECORDER | NECESSARY |
| HDMI#B | [2. 0. 0. 0] | 4 | 111111(hex) | PLAYER (DIGITAL VIDEO CAMERA) | UNNECESSARY |

FIG. 7

| CONNECTION PORT | PHYSICAL ADDRESS | LOGICAL ADDRESS | DEVICE TYPE | OPERATIONAL MODE | HDCP AUTHENTICATION |
|---|---|---|---|---|---|
| HDMI#A | [1. 0. 0. 0] | 1 | HARD DISK RECORDER | TUNER | NECESSARY |
| | | | | PHOTO | UNNECESSARY |
| HDMI#B | [2. 0. 0. 0] | 4 | PLAYER | — | NECESSARY |

FIG. 8

| LOGICAL ADDRESS | DEVICE TYPE | OPERATIONAL MODE | HDCP AUTHENTICATION |
|---|---|---|---|
| 1, 2, 9 | RECORDER | TUNER | NECESSARY |
| | | PHOTO | UNNECESSARY |
| 3, 6, 7 | STB | UNSPECIFIED | NECESSARY |
| 4, 8 | PLAYER | UNSPECIFIED | NECESSARY |
| 5 | AUDIO SYSTEM | UNSPECIFIED | NECESSARY |

FIG. 11

| | |
|---|---|
| InfoFrame Type Code | InfoFrame Type=03h |
| InfoFrame Version Number | Version |
| Length of Source Product Description InfoFrame | Length of Source Product Description InfoFrame=25 |
| Data Byte 1 | Vendor Name Character 1 VN1(7bit ASCII Code) |
| Data Byte 2 | Vendor Name Character 2 VN2 |
| Data Byte 3 | Vendor Name Character 3 VN3 |
| Data Byte 4 | Vendor Name Character 4 VN4 |
| Data Byte 5 | Vendor Name Character 5 VN5 |
| Data Byte 6 | Vendor Name Character 6 VN6 |
| Data Byte 7 | Vendor Name Character 7 VN7 |
| Data Byte 8 | Vendor Name Character 8 VN8 |
| Data Byte 9 | Product Description Character 1 PD1(7bit ASCII) |
| Data Byte 10 | Product Description Character 2 PD2 |
| Data Byte 11 | Product Description Character 3 PD3 |
| Data Byte 12 | Product Description Character 4 PD4 |
| Data Byte 13 | Product Description Character 5 PD5 |
| Data Byte 14 | Product Description Character 6 PD6 |
| Data Byte 15 | Product Description Character 7 PD7 |
| Data Byte 16 | Product Description Character 8 PD8 |
| Data Byte 17 | Product Description Character 9 PD9 |
| Data Byte 18 | Product Description Character 10 PD10 |
| Data Byte 9 | Product Description Character 11 PD11 |
| Data Byte 20 | Product Description Character 12 PD12 |
| Data Byte 21 | Product Description Character 13 PD13 |
| Data Byte 22 | Product Description Character 14 PD14 |
| Data Byte 23 | Product Description Character 15 PD15 |
| Data Byte 24 | Product Description Character 16 PD16 |
| Data Byte 25 | Source Device Information |

F I G. 12

| Code | Source Device Information | HDCP AUTHENTICATION |
|---|---|---|
| 00h | unknow | NECESSARY |
| 01h | Digital STB | NECESSARY |
| 02h | DVD player | NECESSARY |
| 03h | D-VHS | NECESSARY |
| 04h | HDD Videorecorder | NECESSARY |
| 05h | DVC(Digital Video Camera) | UNNECESSARY |
| 06h | DSC(Digital Still Camera) | UNNECESSARY |
| 07h | Video CD | UNNECESSARY |
| 08h | Game | UNNECESSARY |
| 09h | PC general | NECESSARY |
| 0Ah | Blu-ray Disc(BD) | NECESSARY |
| 0Bh | Super Audio CD | UNNECESSARY |

FIG. 16

| CONNECTION PORT | PHYSICAL ADDRESS | LOGICAL ADDRESS | VENDOR ID | DEVICE TYPE | HDCP AUTHENTICATION |
|---|---|---|---|---|---|
| HDMI#B | [2. 0. 0. 0] | 5 | 555555(hex) | AMPLIFIER | DEPENDS ON SELECTED DEVICE UNDER AMPLIFIER |
| HDMI#B | [2. 1. 0. 0] | 1 | 000000(hex) | RECORDER | NECESSARY |
| HDMI#B | [2. 2. 0. 0] | 4 | 111111(hex) | PLAYER (DIGITAL VIDEO CAMERA) | UNNECESSARY |

VIDEO CONTROL APPARATUS AND CONTROL METHOD FOR VIDEO CONTROL APPARATUS

TECHNICAL FIELD

The present invention relates to a video control apparatus and a video control method, and particularly relates to a video control apparatus provided with multiple connection terminals to which a video signal output apparatus, which sends video data and audio data, connects, and to a control method for such a video control apparatus.

BACKGROUND ART

HDMI is an interface through which video signal output apparatuses such as digital video cameras, video recorders, tuners, and so on, can be connected to video control apparatuses such as television receivers, and controlled using a single cable. HDMI stands for High-Definition Multimedia Interface.

HDMI is based on the conventional DVI (Digital Visual Interface) standard, and HDMI is capable of transmitting wideband video and audio signals, and has defined functions such as copyright protection, color difference transmission, and so on for use in household audio-visual electronics. Because HDMI is capable of implementing the stated functions simply by connecting devices with a single cable, it is advantageous for users in that it eliminates the cumbersome need to connect multiple cables. The increase in video signal output apparatuses capable of HDMI output has also led to an increase in video control apparatuses provided with multiple HDMI ports.

HDMI transmits information between connected devices using the TMDS, CEC, and DDC channels. TDMS stands for Transition Minimized Differential Signaling. CEC stands for Consumer Electronics Control. Finally, DDC stands for Display Data Channel.

The TMDS channel transmits video data, audio data, and auxiliary data.

The CEC channel transmits device control signals. The video control apparatus and video signal output apparatus can control one another, through communication using CEC commands (called "CEC communication" hereinafter), using EDID, which shall be mentioned later. For example, a video control apparatus can implement a function for automatically switching its input to the terminal to which a video signal output apparatus is connected in response to a playback operation performed by the video signal output apparatus.

EDID transmission and HDCP-based authentication are performed over the DDC. EDID stands for Extended Display Identification Data. HDCP, meanwhile, stands for High-bandwidth Digital Content Protection.

A video signal output apparatus obtains the display capabilities, audio output capabilities, and so on of a video control apparatus, as well as a physical address expressing its own connection location, based on the EDID held by that video control apparatus. The EDID obtainment operations commence when an HPD (Hot Plug Detect) signal of HDMI in the video control apparatus switches from "off" to "on".

HDCP is a copyright protection technique that encrypts digital data such as video data, audio data, and so on sent from a video signal output apparatus to a video control apparatus, thereby preventing the unauthorized copying of content. When authentication has not been established between a video signal output apparatus and a video control apparatus, the video signal output apparatus immediately stops sending video data and audio data to the video control apparatus, and the video control apparatus also stops decrypting the received video data and audio data.

Here, a video control apparatus provided with multiple HDMI ports shall be considered. In order to enable inter-device control through the stated CEC communication, it is necessary for the video control apparatus to send the EDID to each of the video signal output apparatuses in advance and confirm the physical addresses of those video signal output apparatuses. Accordingly, for each of its HDMI ports, the video control apparatus includes EDID ROMs that store the EDID information.

Furthermore, the video control apparatus stores authentication information used for HDCP authentication in an HDCP ROM. This authentication information is used to decrypt the video data and audio data transmitted from the video signal output apparatus to the video control apparatus. Therefore, the video control apparatus should have a number of HDCP ROMs corresponding to the number of HDMI ports capable of simultaneous display on a single screen. In other words, generally speaking, while the video control apparatus is provided with an EDID ROM for each of its HDMI ports, it is equipped with fewer HDCP ROMs than the number of HDMI ports.

When DDC communication is carried out between the video signal output apparatus and the video control apparatus, if there are fewer HDCP ROMs than there are EDID ROMs, a situation arises in which the video signal output apparatus can access the EDID ROMs but cannot access the HDCP ROMs.

In such a case, no response can be obtained for an HDCP ROM access request, resulting in an undefined state in the DDC line. If the video control apparatus makes an input switch while the DDC line is in an undefined state, the DCC access cannot be restored to its normal state, and thus video signals, audio signals, and so on cannot be output normally. In addition, there are, for example, cases where the video signal output apparatus cannot return to its normal state from a state in which it is standing by for an HDCP ROM access request.

Accordingly, the video control apparatus temporarily puts the HPD signal into an "off" state when each HDMI port is selected and switched to, returning the HPD signal to the "on" state after the passage of a certain amount of time. This resets the DDC signal, and resuming communication thereafter solves the problem of the DDC line entering an undefined state.

Japanese Patent Laid-Open No. 2007-78980 discloses a technique related to DDC communication. According to Japanese Patent Laid-Open No. 2007-78980, when video data and audio data not described in the EDID is transmitted by the video signal output apparatus due to a DDC communication failure etc., the video control apparatus once again switches the HPD signal off and then on, thereby resuming the DDC communication. Resuming the DDC communication causes the video signal output apparatus to obtain the EDID anew and output normal video data and audio data as a result.

However, an undefined state occurs in DDC communication only when a video signal output apparatus that performs HDCP authentication is connected. For example, video signal output apparatuses that output a user's private content, such as a consumer digital video camera, does not require HDCP authentication to be performed. For this reason, DDC communication does not experience an undefined state, and thus processing such as that described above, where switching the HPD signal off and then on again to reset DDC communication and then resume DDC communication, is not necessary.

In other words, for devices that do not require HDCP authentication, it is not necessary to perform processing for turning the HPD signal off and then on again and resuming DDC communication each time an HDMI port is selected and switched to, and thus there has conventionally been the problem that an amount of time equivalent to the switching processing is required. This processing sometimes requires, for example, several seconds.

The technique disclosed in Japanese Patent Laid-Open No. 2007-78980 relates to resuming DDC communication after video data and audio data have been input, but does not discuss operations and processing time when switching inputs, and thus cannot solve this problem.

It should be noted that this problem is not limited to the HDMI standard, and may occur in other video control systems in which the communication line experiences an undefined state when the video control apparatus accesses an encryption key for the purpose of copyright protection.

DISCLOSURE OF INVENTION

It is therefore a feature of the present invention to provide a video control apparatus capable of switching the input for video data, audio data, and the like more quickly, as well as a control method for such a video control apparatus.

According to an aspect of the present invention, there is provided a video control apparatus comprising: a connection unit that connects an external connected apparatus; a storage unit, accessible by the external connected apparatus, that stores authentication information used when it is necessary to authenticate communication by which the external connected apparatus connected to the connection unit outputs video data, audio data, or both video and audio data; a holding unit that holds a first table in which authentication necessity information, indicating whether or not authentication using the authentication information is necessary, is stored in association with a device type defined for the types of respective external connected apparatuses; a determination unit that obtains information indicating the device, type of the external connected apparatus connected to the connection unit and determines whether or not it is necessary to authenticate the external connected apparatus using the authentication information by referring to the first table; and a control unit that controls the external connected apparatus connected to the connection unit to start communication initialization processing including accessing the storage unit when the determination unit has determined that the authentication is necessary, and controls the external connected apparatus connected to the connection unit not to start the communication initialization processing including accessing the storage unit when the determination unit has determined that the authentication is not necessary.

According to another aspect of the present invention, there is provided a control method for a video control apparatus, the apparatus including a connection unit that connects an external connected apparatus and a storage unit, accessible by the external connected apparatus, that stores authentication information used when it is necessary to authenticate communication by which the external connected apparatus connected to the connection unit outputs video data, audio data, or both video and audio data, and the method comprising the steps of: obtaining information indicating the device type of the external connected apparatus connected to the connection unit; determining whether or not it is necessary to authenticate the external connected apparatus connected to the connection unit using the authentication information, by referring to a table in which authentication necessity information, indicating whether or not authentication using the authentication information is necessary, is associated with a device type defined for types of respective external connected apparatuses; and controlling the external connected apparatus connected to the connection unit to start communication initialization processing including accessing the storage unit when it has been determined, in the step of determining, that authentication is necessary, and controlling the external connected apparatus connected to the connection unit not to start the communication initialization processing including accessing the storage unit when it has been determined, in the step of determining, that authentication is not necessary.

Further features of the present invention will become apparent from the following description of exemplary embodiments with reference to the attached drawings.

BRIEF DESCRIPTION OF DRAWINGS

FIG. 5 is a diagram illustrating an example of authentication necessity information associated with vendor IDs and device types.

FIG. 6 is a diagram illustrating an example of a device management table.

FIG. 7 is a diagram illustrating another example of a device management table.

FIG. 8 is a diagram illustrating an example of authentication necessity information associated with operational modes.

FIG. 11 is a diagram illustrating an example of the frame structure of an AVI InfoFrame packet.

FIG. 12 is a diagram illustrating an example of authentication necessity information according to the second embodiment.

FIG. 16 is a diagram illustrating an example of a device management table according to the fourth embodiment.

BEST MODE FOR CARRYING OUT THE INVENTION

<First Embodiment>

A first embodiment of the present invention shall be described hereinafter with reference to the drawings. Note, however, that unless specifically mentioned otherwise, the scope of the present invention is not intended to be limited to the functions, relative arrangements, and so on of the constituent elements described in the embodiments.

Figure 1:
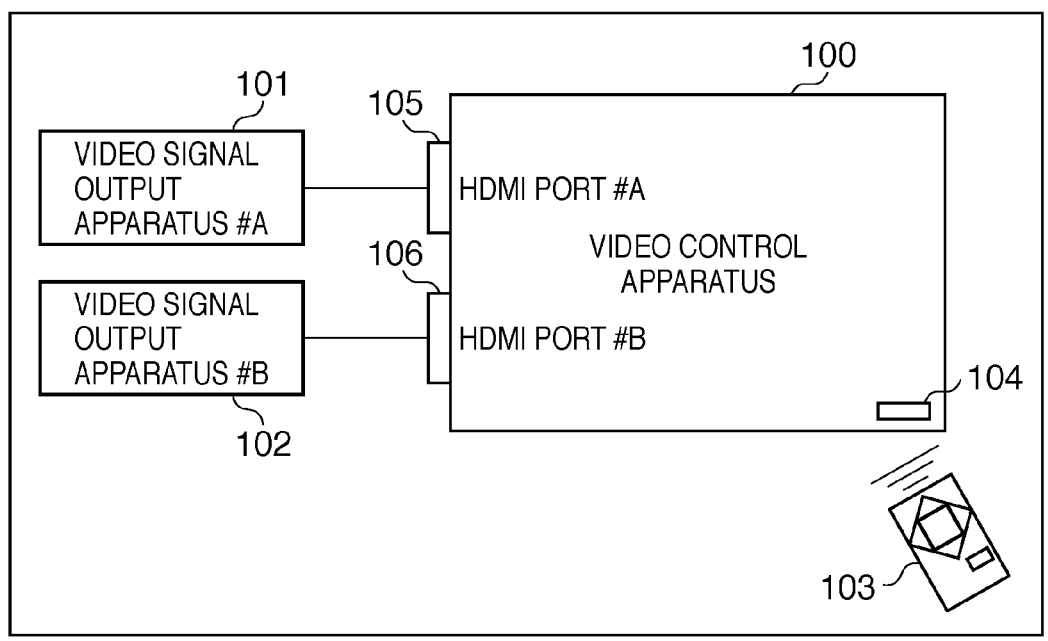
FIG. 1 is a diagram schematically illustrating an example of a system configuration in which the present invention can be applied.

FIG. 1 is a diagram schematically illustrating an example of a system configuration in which the present invention can be applied. In FIG. 1, a television receiver 100, serving as a video control apparatus, is connected to a video signal output apparatus 101 (video signal output apparatus #A) and a video signal output apparatus 102 (video signal output apparatus #B), which serve as external connected apparatuses, via connection lines compliant with the HDMI standard.

The video signal output apparatus 101 is assumed to be a hard disk recorder, tuner, or the like that outputs video data and audio data requiring copyright protection. Meanwhile, the video signal output apparatus 102 is assumed to be, for example, a portable digital video camera, digital camera, or the like that outputs video data and audio data as private content for which no copyright protection is required.

The television receiver 100 can be operated remotely using a remote controller 103. The remote controller 103 generates control signals based on user operations, modulates those signals in infrared light signals, and sends the infrared light signals.

When the television receiver 100 receives the infrared light signals through a remote controller light-receiving unit 104, a CPU 107, mentioned later, controls the various units in the television receiver 100 in accordance with control signals obtained through the conversion of the infrared light signals, thereby operating based on the user operations. For example, the television receiver 100 can select one of an HDMI port 105 (HDMI port #A) and an HDMI port 106 (HDMI port #B) as its external input terminal in response to operations performed using the remote controller 103. Video data and audio data output by a device connected to the HDMI port selected as the external input terminal is then output through a display unit, speakers, and so on of the television receiver 100.

Next, assume that the user has instructed the external input terminal to be switched from the HDMI port 105 to the HDMI port 106 by operating the remote controller 103. In this case, the CPU 107 controls a selector unit 113, mentioned later, to select the HDMI port 106, whereupon video data and audio data output by the video signal output apparatus 102 is then output through the display unit, speakers, or the like of the television receiver 100.

Figure 2:
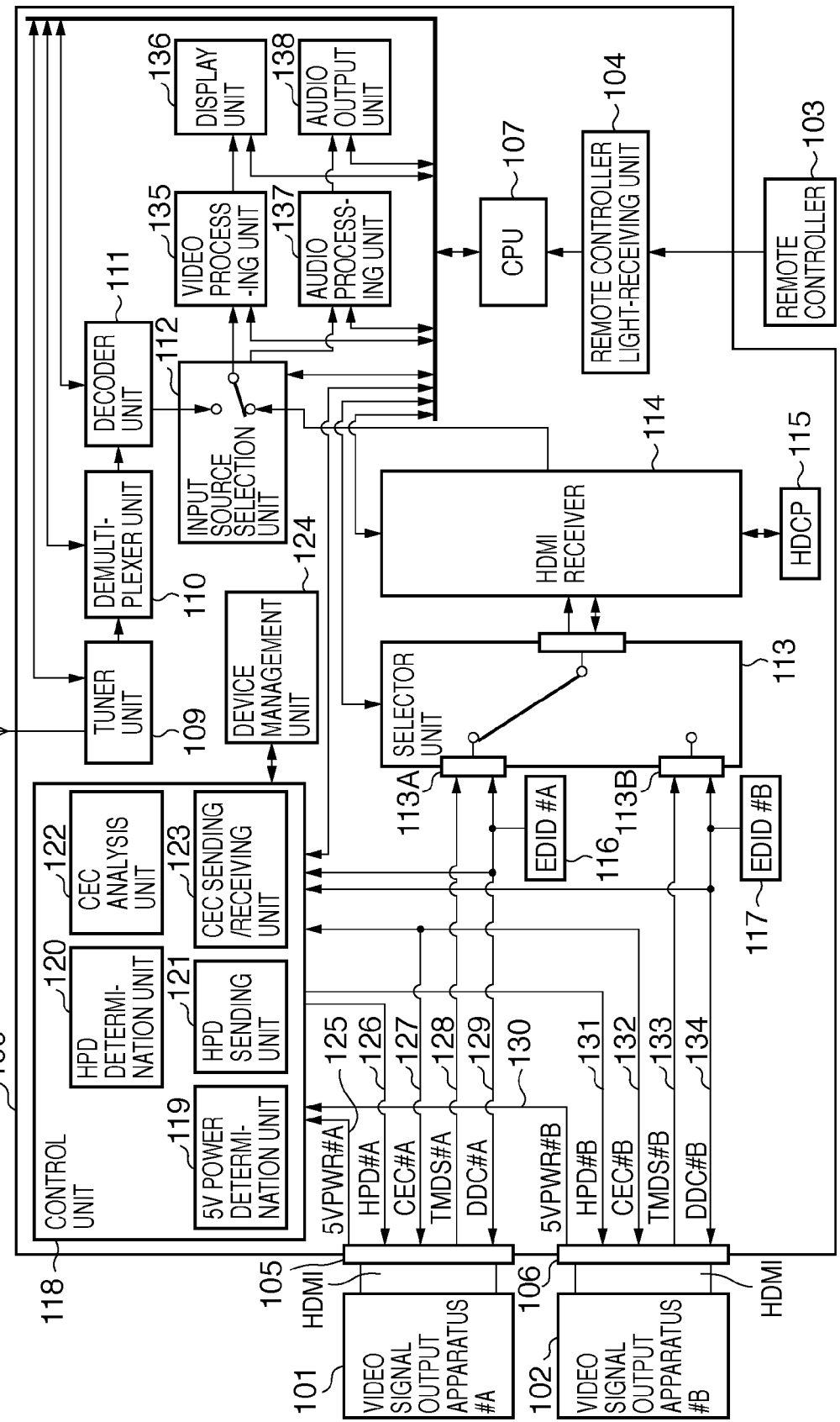
FIG. 2 is a block diagram illustrating an exemplary configuration of a television receiver that can be applied in a first embodiment.

FIG. 2 illustrates an exemplary configuration of the television receiver 100 that can be applied in the present first embodiment. A ROM and a RAM (not shown) are connected to the CPU 107, and the CPU 107 controls the overall operations of the television receiver 100 in accordance with programs stored in the ROM, using the RAM as a work memory. The CPU 107 generates and outputs various types of commands, control signals, and so on for controlling the television receiver 100, based on control signals generated from the infrared light signals sent by the remote controller 103 in response to user operations and received by the remote controller light-receiving unit 104.

A tuner unit 109 performs processing such as demodulation, error correction, and so on, on a signal input through an antenna 108, and generates a transport stream (TS). The tuner unit 109 then performs a descrambling process on the generated TS, and outputs the resultant to a demultiplexer unit 110.

The demultiplexer unit 110 extracts the video data and audio data from the TSs of multiple input channels, and outputs that data to a decoder unit 111. The video data and audio data processed by the decoder unit 111 is then output to an input source selection unit 112.

The selector unit 113, serving as a selection unit, switches between selectable input terminals 113A and 113B based on a selector switch signal supplied by the CPU 107, thereby changing the connection. Through this, the selector unit 113 selects, as a connection unit, one of the HDMI port 105 and the HDMI port 106 to which the video data and audio data is to be input. Here, the CPU 107 generates the selector switch signal based on user operations performed through the remote controller 103. This selector switch signal is supplied to both the selector unit 113 and a control unit 118.

An HDMI receiver 114 decodes the video data and audio data input from the HDMI port 105 or 106, depending on which was selected by the selector unit 113, and outputs that data to the input source selection unit 112.

The input source selection unit 112 selects either the decoder unit 111 or the HDMI receiver 114 as the input source. The video data from the selected input source is supplied to a video processing unit 135, where it undergoes signal processing such as image enhancement processing; the processed data is then supplied to a display unit 136 and displayed in a display device. Similarly, the selected audio data is supplied to an audio processing unit 137, where it undergoes signal processing such as audio enhancement processing; the processed data is then output through an audio device, such as a speaker, by an audio output unit 138.

The HDMI ports 105 and 106 are provided with TMDS lines 128 and 133, 5V power lines 125 and 130, and DDC lines 129 and 134, respectively. The HDMI ports 105 and 106 are further provided with HPD lines 126 and 131, respectively, that serve as control signal lines, as well as CEC lines 127 and 132, respectively, that enable CEC communication between the television receiver 100 and the video signal output apparatuses 101 and 102.

The control unit 118, which serves as a determination unit and a control unit, includes a 5V power determination unit 119, an HPD determination unit 120, an HPD sending unit 121, a CEC analysis unit 122, and a CEC sending/receiving unit 123. These determinations units and sending units included in the control unit 118 are controlled by the CPU 107 or by programs pre-stored in a ROM provided within a sub-microcomputer (not shown).

The TMDS lines 128 and 133, serving as data lines, are lines for carrying video data, audio data, and auxiliary data from the video signal output apparatuses 101 and 102 to the television receiver 100.

The DDC lines 129 and 134 are lines for carrying EDID between the television receiver 100 and the video signal output apparatuses 101 and 102, as well as for exchanging authentication information under HDCP. In other words, the DDC lines 129 and 134 perform the double duties of EDID transmission and the exchange of encryption-based authentication information under HDCP.

The TMDS line 128 and DDC line 129 extended from the HDMI port 105 are connected to the selectable input terminal 113A of the selector unit 113. Meanwhile, an EDID ROM 116 (EDID #A) is connected to the DDC line 129. In the same manner, the TMDS line 133 and DDC line 134 extended from the HDMI port 106 are connected to the selectable input terminal 113B of the selector unit 113. Meanwhile, an EDID ROM 117 (EDID #B) is connected to the DDC line 134.

The EDID ROMs 116 and 117 of the television receiver 100 are rewritable non-volatile memories. Display capabilities, or various types of information related to the television receiver, and a physical address, or address information of the HDMI port used in CEC communication, and so on are stored in the EDID ROMs 116 and 117.

The individual physical addresses of each of the HDMI ports are stored in the EDID ROMs. For example, a physical address of [1.0.0.0] is stored in the EDID ROM 116, and a physical address of [2.0.0.0] is stored in the EDID ROM 117.

The 5V power lines 125 and 130 extended from the HDMI ports 105 and 106, respectively, are each connected to the 5V power determination unit 119 located within the control unit 118. The 5V power lines are lines by which the video signal output apparatuses 101 and 102 make DDC access requests to the television receiver.

The HPD lines 126 and 131 extended from the HDMI ports 105 and 106, respectively, are each connected to the HPD sending unit 121 located within the control unit. The HPD lines are lines for notifying the video signal output apparatuses that DDC access preparation is complete.

The HPD sending unit 121, serving as a notification unit, switches the HPD line potential between a high voltage, or a High state (an "on" level) and a low voltage, or a Low state (an "off" level). When the potential is in the High state, the DDC access preparation is complete in the corresponding HDMI port and DDC access enters an "on" state. However, when the potential is in the Low state, DDC access enters an "off" state. Note that according to the HDMI standard, the High state has a voltage of 2.4V to 5.3V, whereas the Low state has a voltage of 0V to 0.4V.

The CEC lines 127 and 132 extended from the HDMI ports 105 and 106, respectively, are each connected to the CEC sending/receiving unit 123 located within the control unit 118. The CEC lines, serving as command lines, are lines for performing CEC communication between the television receiver 100 and the video signal output apparatuses, and run between all the HDMI ports as buses.

Upon receiving a CEC command from the video signal output apparatus 101 or 102, the television receiver 100 analyzes the command using the CEC analysis unit 122, which serves as an authentication necessity information obtainment unit, and stores the information of the connected device in a device management unit 124. The "information" of the device mentioned here refers to, for example, the physical address associated with the HDMI port to which the device is connected, a logical address indicating the device type, a vendor ID indicating the manufacturer, a device name for notifying the user of the connected device, specific device type information indicating the details of the device type, and so on. "Specific device type information" refers to detailed information regarding the device type, such as whether it is a digital video camera, a DVD player, a CD player, and so on. The device management unit 124 holds the authentication necessity information indicating whether or not HDCP authentication is necessary in association with each device type. The "device type" is identification information defined for different types of devices, such as video signal output apparatuses, for example.

Although the configuration described here is such that the television receiver 100 holds the authentication necessity information in advance, associated with the device types, it should be noted that the configuration is not limited thereto. For example, the configuration may be such that the video signal output apparatuses directly communicate the authentication necessity information to the television receiver 100 using a CEC command. In this case, it is possible for the video signal output apparatus to switch the authentication necessity information depending on the operational mode, or whether broadcast content or private content is being output, and communicate that information to the television receiver 100.

The HPD determination unit 120 determines whether or not it is necessary to turn the HPD signal on or off during the input switch based on the selector switch signal supplied by the CPU 107 and device management information held in the device management unit 124. To be more specific, when the video signal output apparatus connected to the newly-selected selectable input terminal of the selector requires HDCP authentication, the HPD determination unit 120 determines that it is necessary to turn the HPD signal off and on, whereas when the HDCP authentication is not required, the HPD determination unit 120 determines that it is not necessary to turn the HPD signal off and on.

The HPD sending unit 121 performs control for switching the HPD signal to the on or off states based on the result of the determination performed by the HPD determination unit 120.

An HDCP ROM 115, serving as a storage unit, is connected to the HDMI receiver 114. The HDCP ROM 115 holds authentication information used for HDCP authentication. Of the video signal output apparatus 101 and the video signal output apparatus 102, the device connected to the HDMI port selected by the selector unit 113 is capable of accessing the HDCP ROM 115.

When the HDCP authentication process is successful between the television receiver 100 and the video signal output apparatus 101 or 102, the HDMI receiver 114 decrypts the video data and audio data supplied by the selector unit 113.

Next, the processing according to the first embodiment of the present invention shall be described with reference to the flowchart in FIG. 3, the timing chart in FIG. 4, and the above-described block diagram in FIG. 2.

Figure 3:
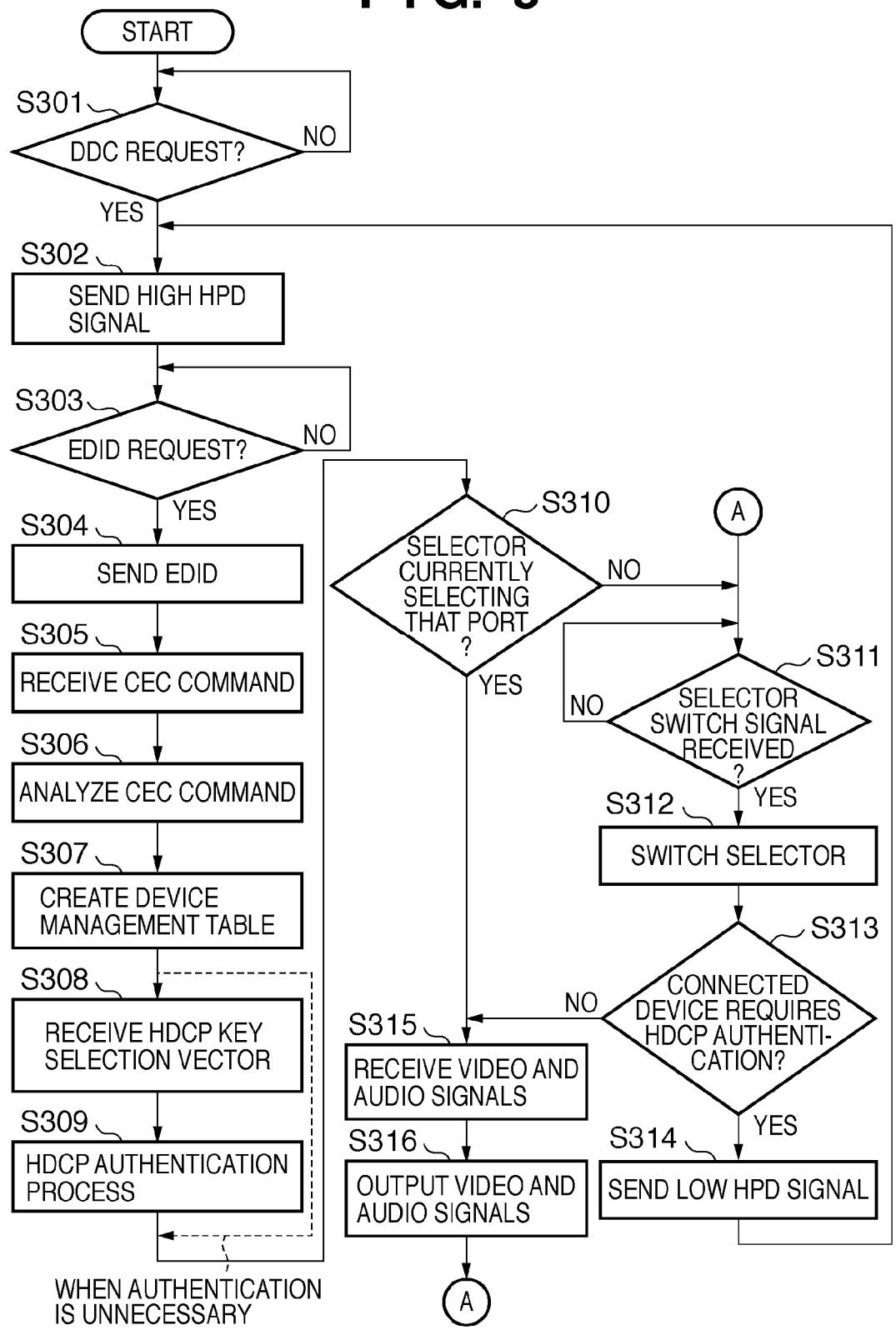
FIG. 3 is a flowchart illustrating an example of the processing performed in the first embodiment.

FIG. 3 is a flowchart illustrating an example of the processing performed in the first embodiment of the present invention. In step S301, the control unit 118 stands by for a DDC access request from the video signal output apparatus 101 or 102. The 5V power determination unit 119 determines whether or not a DDC access request is present based on the voltage values in the 5V power lines 125 and 130.

The video signal output apparatuses 101 and 102 are connected to the television receiver 100, and make DDC access requests to the television receiver 100 when, for example, turned on or placed in a standby state as a result of user operations. When the television receiver 100 has determined that there has been a DDC access request from the video signal output apparatus 101 or 102, the process moves to the following step, or step S302.

Note that unless otherwise mentioned, the video signal output apparatus 101, which requires HDCP authentication, is assumed hereinafter to be connected to the HDMI port 105. Of course, the following descriptions also apply if "video signal output apparatus 101" is replaced with "video signal output apparatus 102" and "HDMI port 105" is replaced with "HDMI port 106".

In step S302, the HPD sending unit 121 sends a High-state HPD signal to the HPD line 126 on which the DDC access occurred, and notifies the video signal output apparatus 101 that the DDC access has entered the on state. Based on this, the video signal output apparatus 101 commences communication initialization processing for the DDC access.

Next, in step S303, the control unit 118 stands by for an EDID request from the video signal output apparatus 101 performing the DDC access. When the video signal output apparatus 101 supplies a slave address and read command to the EDID ROM 116 over the DDC line 129, the control unit 118 reads out the EDID from the EDID ROM 116. The read-out EDID is then sent to the video signal output apparatus 101 (step S304).

The video signal output apparatus 101 then defines its own physical address based on the physical address of the HDMI port contained in the received EDID. After this, a definition process for defining the logical addresses allocated on a device-by-device basis is performed so that CEC command exchange can be carried out. To be more specific, a polling message is sent to each logical address allocated per device type based on the HDMI standard, and logical addresses that do not respond are judged to be usable addresses and are defined thus.

Upon having a logical address defined, the video signal output apparatus 101 sends a CEC command, containing device information, to the television receiver 100 over the CEC line 127. Then, upon receiving the CEC command sent by the video signal output apparatus 101 (step S305), the control unit 118 of the television receiver 100 decodes the received command and supplies the decoded command to the CEC analysis unit 122.

The CEC analysis unit 122 obtains the device information contained as command parameters within the supplied CEC command (step S306). Here, the obtained physical address, logical address, vendor ID, device name, and specific device type information are supplied to the device management unit 124. The device management unit 124 stores this supplied device information in the device management table as the device information of the device connected to the HDMI port 105. In addition, the device management unit 124 holds, in advance, authentication necessity information, indicating whether or not HDCP authentication is necessary, associated with each device type (and device type/vendor ID combination). FIG. 5 illustrates an example of the authentication necessity information that is held, associated with the device type and vendor ID. In this case, when the device has a device type of "player" (the logical address is "4" or "8"), HDCP authentication is unnecessary when the vendor ID is "111111 (hex)", but is necessary when the vendor ID is an ID aside from "111111(hex)". In this manner, HDCP authentication is determined to be unnecessary when the vendor ID is "111111 (hex)", indicating a maker who manufactures consumer devices. FIG. 5 shows an example in which authentication necessity information is associated with each combination of device type and vendor ID, but the scheme used is not limited to this combination. For example, the authentication necessity information may be associated with each combination of device type and specific device type. When the device has a device type of "player" (the logical address is "4" or "8"), HDCP authentication is determined to be unnecessary when the specific device type is "digital video camera (consumer device)", whereas HDCP authentication is determined to be necessary when the specific device type is "DVD player (non-consumer device)". In addition, the authentication necessity information may be associated with each combination of device type and device name, or each combination of device type, specific device type, and vendor ID. Whether or not authentication is necessary can be determined with higher accuracy if other information obtained from the connected device is used, rather than simply using only the logical address that indicates the device type. The device management unit 124 checks the content of the CEC command from the video signal output apparatus against the authentication necessity information, and generates the device management table (step S307).

FIG. 6 is an example of the device management table created based on the received CEC command. The device management table associates device information such as the physical address, logical address, vendor ID, and device type with authentication necessity information indicating whether or not HDCP authentication is required, and stores this associated information for each connection port. In the example shown in FIG. 6, it can be seen that the device connected to the HDMI port #A requires HDCP authentication, whereas the device connected to the HDMI port #B does not require HDCP authentication.

FIG. 7 illustrates an example of the device management table in the case where the video signal output apparatus switches between requiring and not requiring HDCP authentication, and providing a notification thereof, depending on whether the operational mode is the operational mode for outputting broadcast content or the operational mode for outputting private content. For example, the video signal output apparatus 101 connected to the HDMI port 105 notifies the television receiver 100 of its operational mode before outputting video data. The television receiver 100 manages the device information of the video signal output apparatus 101 in association with the authentication necessity information based on this notification. FIG. 8 illustrates an example of the authentication necessity information that is held, associated with the device type and operational mode. FIG. 8 shows an example in which the authentication necessity information is associated with each combination of device type and operational mode. In this case, when the device has a device type of "recorder" (the logical address is "1", "2", or "9"), HDCP authentication is necessary when the operational mode is "tuner mode" and is unnecessary when the operational mode is "photo mode". In this manner, it is determined that HDCP authentication is unnecessary during the "photo mode", where private content is output. In the example shown in FIG. 7, authentication necessity information is associated with each of the two operational modes, or the tuner mode and the photo mode, of the device connected to the HDMI port #A.

When the reception of the EDID is complete, the video signal output apparatus 101 uses the CEC command to communicate the device information to the control unit 118. In addition to this, the video signal output apparatus 101 sends a Key Selection Vector to the television receiver 100 over the DDC line 129 (step S308). Then, in step S309, an attempt is made to perform the HDCP authentication process.

Next, in step S310, it is determined whether or not the HDMI port 105, which is involved in the sending of the Key Selection Vector in step S308, is selected by the selector unit 113. If it has been determined that the HDMI port 105 is selected, the process moves to step S315.

Note that for devices that do not require HDCP authentication, the processes of steps S308 and S309 described above are not carried out, and the processing moves directly from the stated step S307 to step S310. For example, referring to the device information table shown in FIG. 6, described above, it can be seen that an HDCP authentication process is not necessary for the device connected to the HDMI port #A. Therefore, when the above-described process, starting with step S301, is carried out in response to a DDC request from this device, the process moves directly to step S310 after the device management table is created in step S307.

On the other hand, if, in step S310, it is determined that the HDMI port 105 is not selected, the process moves to step S311. In this case, the video signal output apparatus 101 cannot access the HDCP ROM 115, and thus the HDCP authentication process attempted in step S309 fails.

In step S311, the apparatus stands by to receive the selector switch signal. When the selector switch signal is received and a change in the selectable input terminal is detected, the selectable input terminal is switched by the selector unit 113 in the following step S312, based on the received selector switch signal. In this example, the selectable input terminal 113B is switched to the selectable input terminal 113A, and the HDMI port 105 is selected as a result.

Next, the HPD determination unit 120 obtains the authentication necessity information of the video signal output apparatus 101 connected to the HDMI port 105 selected through the selectable input terminal 113A that has been switched to, the information being obtained from the device management table held by the device management unit 124.

Then, in the following step S313, it is determined whether or not the video signal output apparatus 101 connected to the HDMI port 105 selected by the selectable input terminal 113A that has been switched to requires HDCP authentication, based on the obtained authentication necessity information. If it has been determined that HDCP authentication is necessary, the process moves to step S314.

In step S314, the HPD sending unit 121 sends a Low HPD signal to the video signal output apparatus 101 connected to the HDMI port 105 for a predetermined amount of time. The amount of time for which the Low HPD signal is sent is set to an amount of time whereby a video signal output apparatus can detect the Low state, and is specified as a minimum of 100 ms by the HDMI standard. It is assumed that in step S314, the Low HPD signal is sent for a period of 300 ms, or more than this minimum amount of time.

Although the amount of time for which the Low HPD signal is sent is specified as 300 ms in the present first embodiment, it should be noted that the embodiment is not limited thereto. In other words, this time of 300 ms has simply been determined empirically to be the necessary amount of time for a video signal output apparatus to detect the Low state, and thus other amounts of time may be used as long as the video signal output apparatus can detect the Low state.

When the sending of the HPD signal in step S314 is complete, the process returns to step S302. The HPD sending unit 121 then sends a High HPD signal to the video signal output apparatus 101 selected by the selector unit 113 in step S310. Through this, the video signal output apparatus is once again notified that the DDC access preparation is complete, the communication initialization processing is executed once again, and the EDID request process and HDCP authentication process are carried out.

However, if, in the above-described step S313, it is determined based on the authentication necessity information in the device management table that the HDCP authentication process is unnecessary, the process moves to step S315. In this case, it is not necessary to perform the DDC communication initialization processing, and the HPD signal is kept at High.

In step S315, the television receiver 100 receives the video data and audio data sent by the video signal output apparatus connected to the HDMI port currently selected by the selector unit 113. This video data and audio data are supplied to the HDMI receiver 114 through the HDMI port 105 or 106 and the selector unit 113. The HDMI receiver 114 then decrypts this video data and audio data, and supplies a video signal to the video processing unit 135 and an audio signal to the audio processing unit 137 via the input source selection unit 112.

Then, in step S316, the video processing unit 135 and audio processing unit 137 perform processes for outputting the supplied video data and audio data, respectively. The process then returns to step S311, where the apparatus stands by for the selector switch signal.

The above describes a situation where a video signal output apparatus is connected to only one of the HDMI ports 105 and 106. However, the present first embodiment is not limited thereto, and is applicable in the case where video signal output apparatuses are connected to both the HDMI ports 105 and 106. In such a case, the television receiver 100 performs the processes of the above-described steps S301 to S309 for both video signal output apparatuses connected to the HDMI ports 105 and 106. Through this, the device information of both video signal output apparatuses connected to the HDMI ports 105 and 106 can be obtained and the device management table created.

The processing performed in the first embodiment shall be described in further detail hereinafter using the timing chart in FIG. 4, referring also to the flowchart in FIG. 3 as appropriate.

Figure 4:
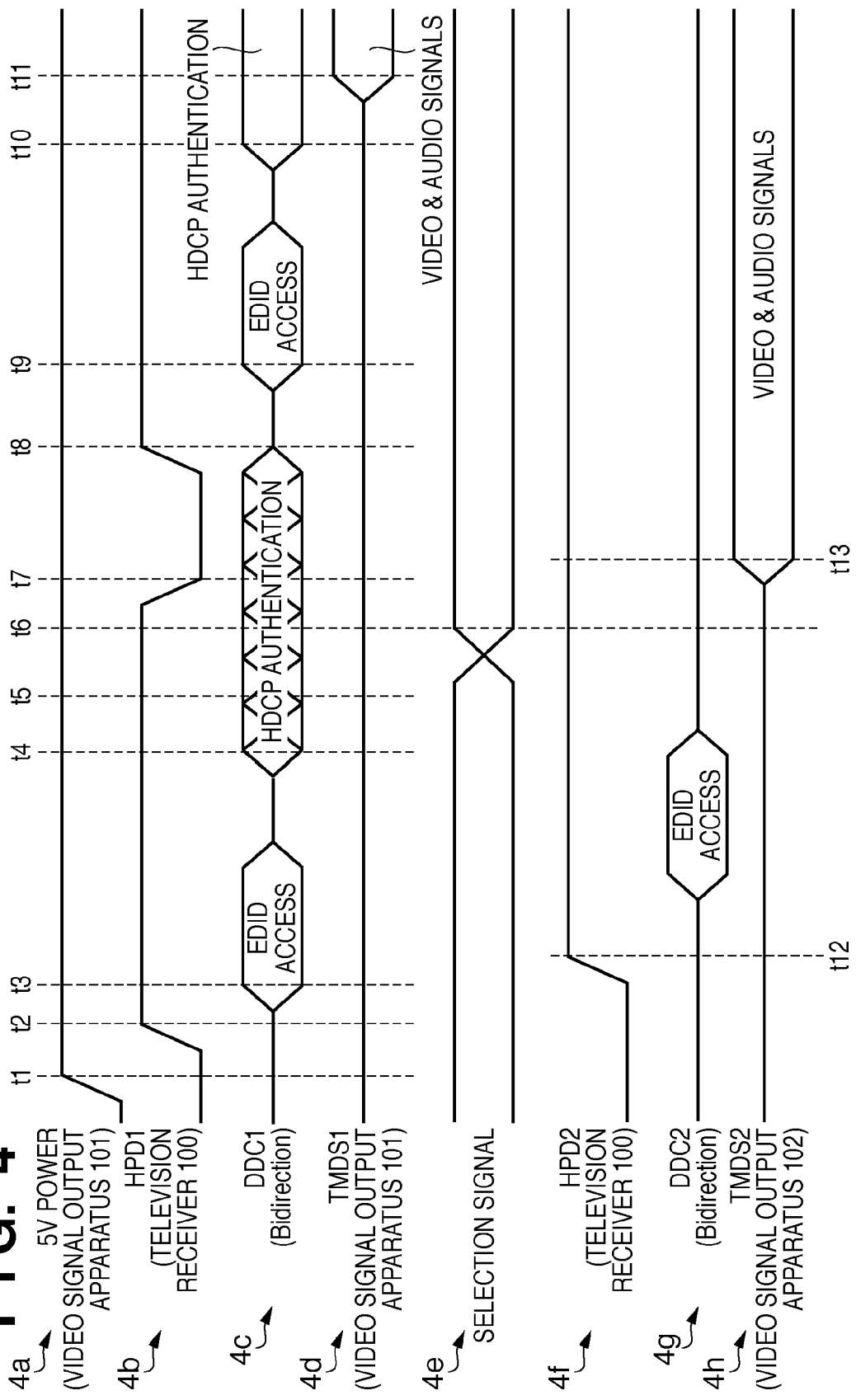
FIG. 4 is an exemplary timing chart illustrating the processing performed in the first embodiment.

In FIG. 4, reference signs 4a through 4d are examples of the timings of the various signals in the HDMI port 105, and reference signs 4f through 4h are examples of the timings of the various signals in the HDMI port 106. A reference sign 4e, meanwhile, represents the operational timing of the selector unit 113.

To be more specific, the reference sign 4a represents an example of the change in voltage in the 5V power line. The reference signs 4b and 4f represent examples of changes in voltages in the respective HPD lines. The reference signs 4c and 4g represent examples of the respective DDC access states. Finally, the reference signs 4d and 4h represent examples of the video data and audio data output form the respective selectors.

Here, it is assumed that the video signal output apparatus 101, which requires HDCP authentication, is connected to the HDMI port 105, whereas the video signal output apparatus 102, which does not require HDCP authentication, is connected to the HDMI port 106. Furthermore, the following descriptions assume that, when either of the video signal output apparatuses is selected, the selector unit 113 is currently selecting a different HDMI port than the HDMI port it is to select thereafter.

A case where the HDMI port 106 is selected by the selector unit 113 from times t1 to t5, and then, at time t6, the selector unit 113 is caused to select the HDMI port 105 in response to, for example, a user operation, shall be described hereinafter, as a first example.

First, a predetermined voltage is applied to the 5V power line 125 in response to, for example, the video signal output apparatus 101 being started up (time t1 in FIG. 4). The 5V power determination unit 119 then determines that a DDC access request has been made by the video signal output apparatus 101 based on the voltage value in the 5V power line 125 (step S301 in FIG. 3).

In response to this DDC access request, the HPD signal is set to High by the HPD sending unit 121 at time t2 (step S302 in FIG. 3). Then, at time t3, the video signal output apparatus 101 sends a request to access the EDID ROM 116 to the television receiver 100.

The EDID read out from the EDID ROM 116 in response to this access request is sent to the video signal output apparatus 101 at time t3 (steps S303 and S304 in FIG. 3). Upon completing the EDID readout, the video signal output apparatus 101 sends a CEC command to the television receiver 100. Having received this CEC command, the television receiver 100 analyzes the CEC command, creates a device management table, and stores the table in the device management unit 124 (steps S305 to S307).

The video signal output apparatus 101 then sends an HDCP Key Selection Vector to the television receiver 100 (step S308 in FIG. 3), and, at time t4, attempts HDCP authentication (step S309 in FIG. 3).

At time t4, the selectable input terminal 113B is currently selected by the selector unit 113, and thus the video signal output apparatus 101 cannot access the HDCP ROM 115. For this reason, the video signal output apparatus 101 fails at authentication, and thus the DDC line 129 enters an undefined state.

Then, it is assumed that at time t6, a selector switch signal is applied to the selector unit 113 in response to, for example, a user operation (step S311 in FIG. 3). In response to this selector switch signal, the selector unit 113 switches from the selectable input terminal 113B to the selectable input terminal 113A (step S312). This makes it possible for the video signal output apparatus 101 to access the HDCP ROM 115.

Here, the control unit 118 determines whether or not the video signal output apparatus 101 connected to the HDMI port 105 is a device that requires HDCP authentication based on the device management table stored in the device management unit 124 (step S313 in FIG. 3). In accordance with the result of this determination, the HPD sending unit 121 holds the HDP signal on the HPD line 126 at Low for, for example, a period of 300 ms (from time t7 to t8) (step S314 in FIG. 3).

At time t8, which is 300 ms after time t7, a High HPD signal is sent by the HPD sending unit 121 to the HPD line 126 (step S302 in FIG. 3). The video signal output apparatus 101 makes an EDID access request to the television receiver 100 based on this High HPD signal. The television receiver 100 then sends the EDID to the video signal output apparatus 101 in response to this request (time t9; steps S303 and S304 in FIG. 3).

Furthermore, the Key Selection Vector is sent from the video signal output apparatus 101 and received by the television receiver 100 at time t10 (step S308 in FIG. 3).

At time t11, when HDCP authentication succeeds (step S309 in FIG. 3), the video data and audio data is sent from the video signal output apparatus 101 to the television receiver 100.

Next, a case where the HDMI port 106, to which the video signal output apparatus 102 that does not require HDCP authentication is connected, is selected shall be described as a second example. It is assumed that at time t12, the video signal output apparatus 102 is connected to the HDMI port 106, and that the HDMI port 105 is currently selected by the selector unit 113. It is also assumed that after that, at time t6, the HDMI port 106 is selected by the selector unit 113 in response, for example, to a user operation.

As with the example of the video signal output apparatus 101 described above, a predetermined voltage is applied to the 5V power line 130 in response to, for example, the video signal output apparatus 102 being started up. The 5V power determination unit 119 then determines that a DDC access request has been made by the video signal output apparatus 102 based on the voltage value in the 5V power line 130. In response to this DDC access request, the HPD signal is set to High by the HPD sending unit 121, and the video signal output apparatus 102 sends a request to access the EDID ROM 116 to the television receiver 100.

The EDID read out from the EDID ROM 116 in response to this access request is sent to the video signal output apparatus 102. After this, a device management table is created for the video signal output apparatus 102 and stored in the device management unit 124 through the processes from step S305 to S307 in FIG. 3.

Because the video signal output apparatus 102 is a device that does not require HDCP authentication, the processes in steps S308 and S309 are not performed, and the apparatus stands by for the selector switch signal to be sent to the selector unit 113 (step S311 in FIG. 3).

When the selector switch signal is received at time t6, the selector unit 113 switches from the selectable input terminal 113A to the selectable input terminal 113B (step S312 in FIG. 3). Here, the control unit 118 determines that the video signal output apparatus 102 connected to the HDMI port 106 is a device that does not require HDCP authentication based on the device management table (step S313 in FIG. 3), and thus keeps the HPD signal in the HPD line at High.

Accordingly, video and audio data is output from the video signal output apparatus 102 to the television receiver 100 at time t13 simply by the selector unit 113 switching from the selectable input terminal 113A to the selectable input terminal 113B (steps S315 and S316 in FIG. 3).

According to the configuration described thus far, the process for resuming DDC communication when switching HDMI ports is not necessary for video signal output apparatuses that output video and audio data that do not require copyright protection and thus do not require HDCP authentication, such as digital video cameras. Therefore, the amount of time between the HDMI port switching operation and the output of the video and audio data can be reduced.

Furthermore, when a video signal output apparatus that requires HDCP authentication can access the EDID ROM but cannot access the HDCP ROM, thus causing an undefined state in the DDC line, a process for resuming the DDC communication is performed. Therefore, the television receiver can output video and audio in a stable manner when the HDMI port is switched.

<Second Embodiment>

Next, the processing according to a second embodiment of the present invention shall be described with reference to the block diagram in FIG. 9 and the flowchart in FIG. 10.

Figure 9:
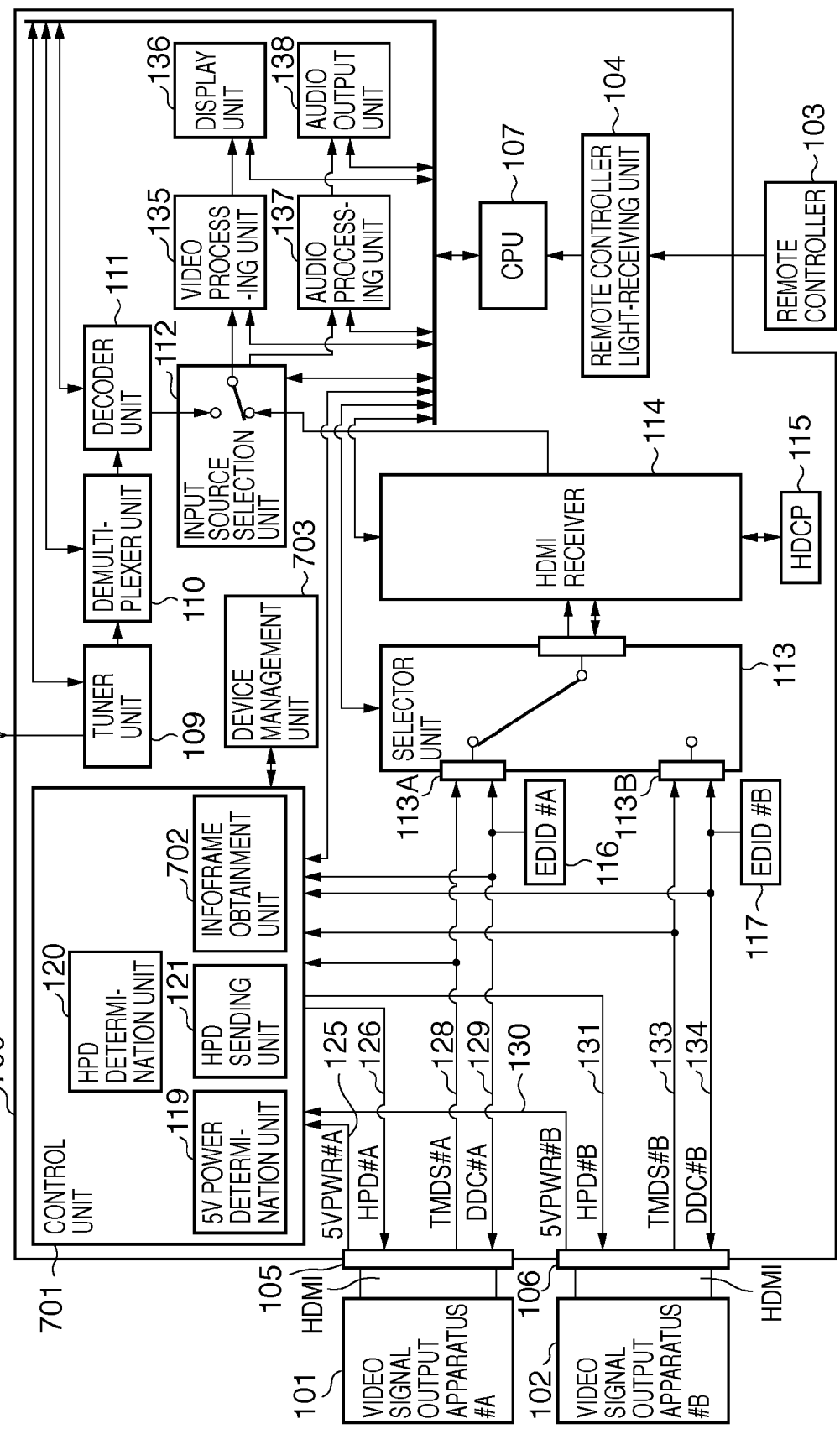
FIG. 9 is a block diagram illustrating an exemplary configuration of a television receiver that can be applied in a second embodiment.

FIG. 9 illustrates an exemplary configuration of a television receiver 700 that can be applied in the present second embodiment. Note that in FIG. 9, elements that are the same as those in the above-described FIG. 2 are given the same reference numerals, and detailed descriptions thereof shall be omitted. A control unit 701 corresponds to the control unit 118 shown in FIG. 2, and has, in addition to the 5V power determination unit 119, HPD determination unit 120, and HPD sending unit 121, an InfoFrame obtainment unit 702, which is a configuration unique to the present second embodiment.

The InfoFrame obtainment unit 702, which serves as an authentication necessity information obtainment unit, obtains InfoFrame packets in the Data Island period, contained as auxiliary data within the data transmitted over the TMDS lines 128 and 133.

To be more specific, auxiliary data output by the video signal output apparatus 101 and input into the HDMI port 105, for example, is supplied to the selector unit 113 over the TMDS line 128. If the selectable input terminal 113A, corresponding to the HDMI port 105, is selected by the selector unit 113, that auxiliary data will be supplied to the HDMI receiver 114. The HDMI receiver 114 then extracts the InfoFrame packet from the supplied auxiliary data, and passes the extracted packet to the InfoFrame obtainment unit 702 within the control unit 118.

The InfoFrame obtainment unit 702 analyzes the obtained InfoFrame packet, obtains information of the devices connected to the corresponding TMDS lines 128 and 133, and stores that device information in a device management unit 703. Specifically, a device type indicated by Source Device Information data contained in an AVI InfoFrame packet is obtained.

FIG. 11 is a diagram illustrating an example of the frame structure of an AVI InfoFrame packet. Frames are defined on a byte-by-byte basis, and the type of the InfoFrame packet is indicated by the first frame, or InfoFrame Type Code. The next frame, or InfoFrame Version Number, indicates the version, and the next frame after that, or the Length of Source Product Description InfoFrame, indicates the length of the frames that follow that frame. The frames Data Byte 1 through 8 hold a 7-bit ASCII code indicating the vendor name. The frames Data Byte 9 through 24 hold a 7-bit ASCII code indicating the model name.

The frame Data Byte 25 holds Source Device Information data. This Source Device Information data is code for identifying the device type.

As with the device management unit 124 in the above first embodiment, the device management unit 703 holds the authentication necessity information indicating whether or not HDCP authentication is necessary in association with each device type. FIG. 12 illustrates an example of the authentication necessity information according to the present second embodiment. Accordingly, authentication necessity information indicating whether or not HDCP authentication is necessary is stored, in advance, in association with each device type defined in the Source Device Information data. The device management unit 703 generates a device management table by comparing the content of the InfoFrame packets from the video signal output apparatus with the authentication necessity information.

It should be noted that unlike the video data and audio data transmitted via HDMI, the InfoFrame packets are not encrypted. The InfoFrame packets can therefore be sent by video signal output apparatuses and received by television receivers regardless of the HDCP authentication result.

Furthermore, although the configuration described here is such that the television receiver 700 holds the authentication necessity information in advance, associated with the device types, the configuration is not limited thereto. For example, a situation where Vendor Specific InfoFrame packets, which can be defined by the vendor, are used as InfoFrame packets can also be considered. In such a case, the video signal output apparatus 101 or 102 can use Vendor Specific InfoFrame packets to directly notify the television receiver 700 whether or not that video signal output apparatus requires HDCP authentication. With this configuration, the video signal output apparatus can dynamically switch between requiring and not requiring HDCP authentication depending on its operational mode, and notify the television receiver 700 thereof. The television receiver 700, meanwhile, does not need to hold, in advance, the authentication necessity information associated with each device type.

Figure 10:
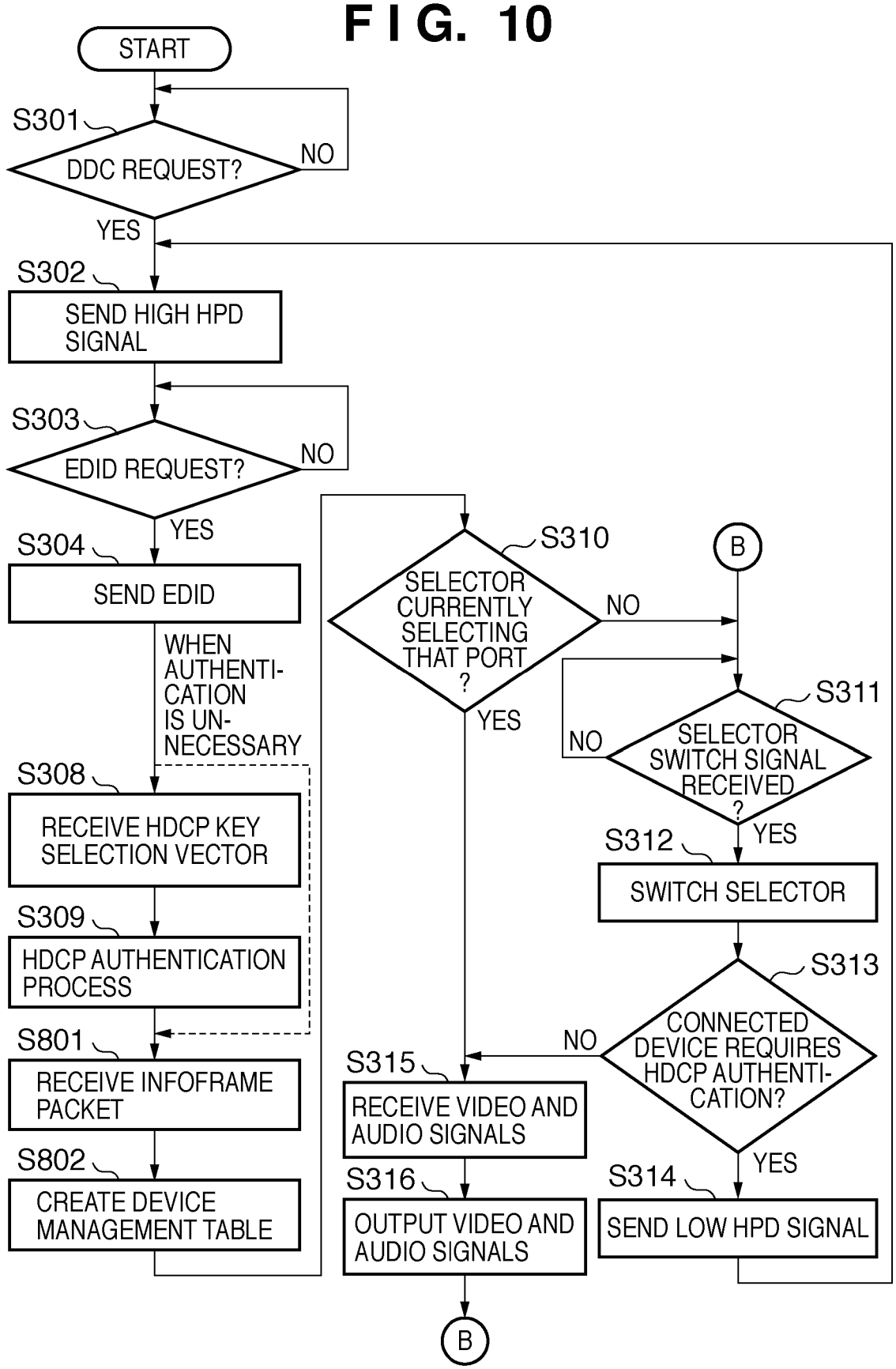
FIG. 10 is a flowchart illustrating an example of the processing performed in the second embodiment.

FIG. 10 is a flowchart illustrating an example of the processing performed in the second embodiment of the present invention. Note that in FIG. 10, portions that are the same as those in the above-described FIG. 3 are given the same reference numerals, and detailed descriptions thereof shall be omitted. In steps S301 to S304, when the reception of the EDID is completed by the video signal output apparatus 101 or 102, that video signal output apparatus sends a Key Selection Vector to the television receiver 700 over the DDC line (step S308), and attempts an HDCP authentication process.

Note that unless otherwise mentioned, the video signal output apparatus 101, which requires HDCP authentication, is assumed hereinafter to be connected to the HDMI port 105. Of course, the following descriptions also apply if "video signal output apparatus 101" is replaced with "video signal output apparatus 102" and "HDMI port 105" is replaced with "HDMI port 106".

When the HDCP authentication succeeds (step S309), the video signal output apparatus 101 starts sending an InfoFrame packet. The television receiver 700 receives the InfoFrame packet sent by the video signal output apparatus 101 and supplies that packet over the TMDS line 128 to the InfoFrame obtainment unit 702 in the control unit 701 (step S801).

The InfoFrame obtainment unit 702 analyzes the supplied InfoFrame packet and extracts the AVI InfoFrame packet or Vendor Specific InfoFrame packet containing the device information. The InfoFrame obtainment unit 702 then obtains the device type, vendor name, and device name from the extracted packet and supplies that information to the device management unit 703. The device management unit 703 associates the authentication necessity information held in advance for each device type with the device information obtained from the packet based on the device type obtained from the packet and stores that associated information in the device management table (step S802).

Next, in step S310, it is determined whether or not the HDMI port 105, which is involved in the receiving of the Key Selection Vector in step S308, is selected by the selector unit 113. If it has been determined that the HDMI port 105 is selected, the process moves to step S315.

Note that for devices that do not require HDCP authentication, the processes of steps S308 and S309 described above are not carried out, and the processing moves directly from the stated step S304 to step S801. For example, when the device has sent the EDID in step S304, it then sends the InfoFrame packet.

However, if, in step S310, it is determined that the HDMI port 105 is not selected, the process moves to step S311. In this case, the video signal output apparatus 101 connected to the HDMI port 105 cannot access the HDCP ROM 115, and thus the authentication process fails.

In step S311, the apparatus stands by to receive the selector switch signal. When the selector switch signal is received, the selectable input terminal is switched by the selector unit 113 in the following step S312, based on the received selector switch signal. In this example, the selector unit 113 switches from the selectable input terminal 113B to the selectable input terminal 113A, and the HDMI port 105 is selected as a result.

Next, the HPD determination unit 120 obtains the authentication necessity information of the video signal output apparatus 101 connected to the HDMI port 105 selected through the selectable input terminal 113A that has been switched to, the information being obtained from the device management table held by the device management unit 703.

Then, in the following step S313, it is determined whether or not the video signal output apparatus 102 connected to the HDMI port selected by the selectable input terminal that has been switched to requires HDCP authentication, based on the obtained authentication necessity information. If it has been determined that HDCP authentication is necessary, the process moves to step S314. In step S314, the HPD sending unit 121 sends, for a predetermined amount of time (for example, 300 ms), a Low HPD signal to the video signal output apparatus connected to the HDMI port that has been switched to.

When the sending of the HPD signal in step S314 is complete, the process returns to step S302. The HPD sending unit 121 then sends a High HPD signal to the video signal output apparatus 101 selected by the selector unit 113 in step S312. Through this, the video signal output apparatus 101 is once again notified that the DDC access preparation is complete, the communication initialization processing is executed once again, and the EDID request process and HDCP authentication process are carried out.

However, if, in the above-described step S313, it is determined based on the authentication necessity information in the device management table that the video signal output apparatus 101 does not require the HDCP authentication process, the process moves to step S315. In this case, it is not necessary to perform the DDC communication initialization processing, and the HPD signal is kept at High.

In step S315, the television receiver 100 receives the video data and audio data sent by the video signal output apparatus connected to the HDMI port currently selected by the selector unit 113. This video data and audio data are supplied to the HDMI receiver 114 through the HDMI port 105 or 106 and the selector unit 113. The HDMI receiver 114 then decrypts this video data and audio data, and supplies a video signal to the video processing unit 135 and an audio signal to the audio processing unit 137 via the input source selection unit 112.

Then, in step S316, the video processing unit 135 and audio processing unit 137 perform processes for outputting the supplied video data and audio data, respectively. The process then returns to step S311, where the apparatus stands by for the selector switch signal.

It should be noted that like the above-described first embodiment, the present second embodiment can also be applied in the case where the video signal output apparatuses 101 and 102 are connected to the HDMI ports 105 and 106, respectively.

In the present second embodiment, when the HDMI port to which a device that requires HDCP authentication is connected is not selected, that device cannot access the HDCP ROM 115, and thus the authentication fails. In this case, if, for example, the authentication fails in step S309, skipping the processes in steps S801 and S802 and moving to the process in step S311 can be considered. Then, if, when the selector is then switched in step S312 and the device management table is referred to in step S313, the device information of that device is not present in the device management table, the process moves to step S314, and the DDC communication is resumed.

According to the configuration described thus far, the process for resuming DDC communication when switching HDMI ports is not necessary for video signal output apparatuses that output video and audio data that do not require copyright protection and thus do not require HDCP authentication, such as digital video cameras. Therefore, the amount of time between the HDMI port switching operation and the output of the video and audio data can be reduced. Furthermore, because the present second embodiment omits the CEC control, the same effects as in the above-described first embodiment can be obtained with a lighter hardware configuration.

<Third Embodiment>

Next, the processing according to a third embodiment of the present invention shall be described with reference to the block diagram in FIG. 13 and the flowchart in FIG. 14.

Figure 13:
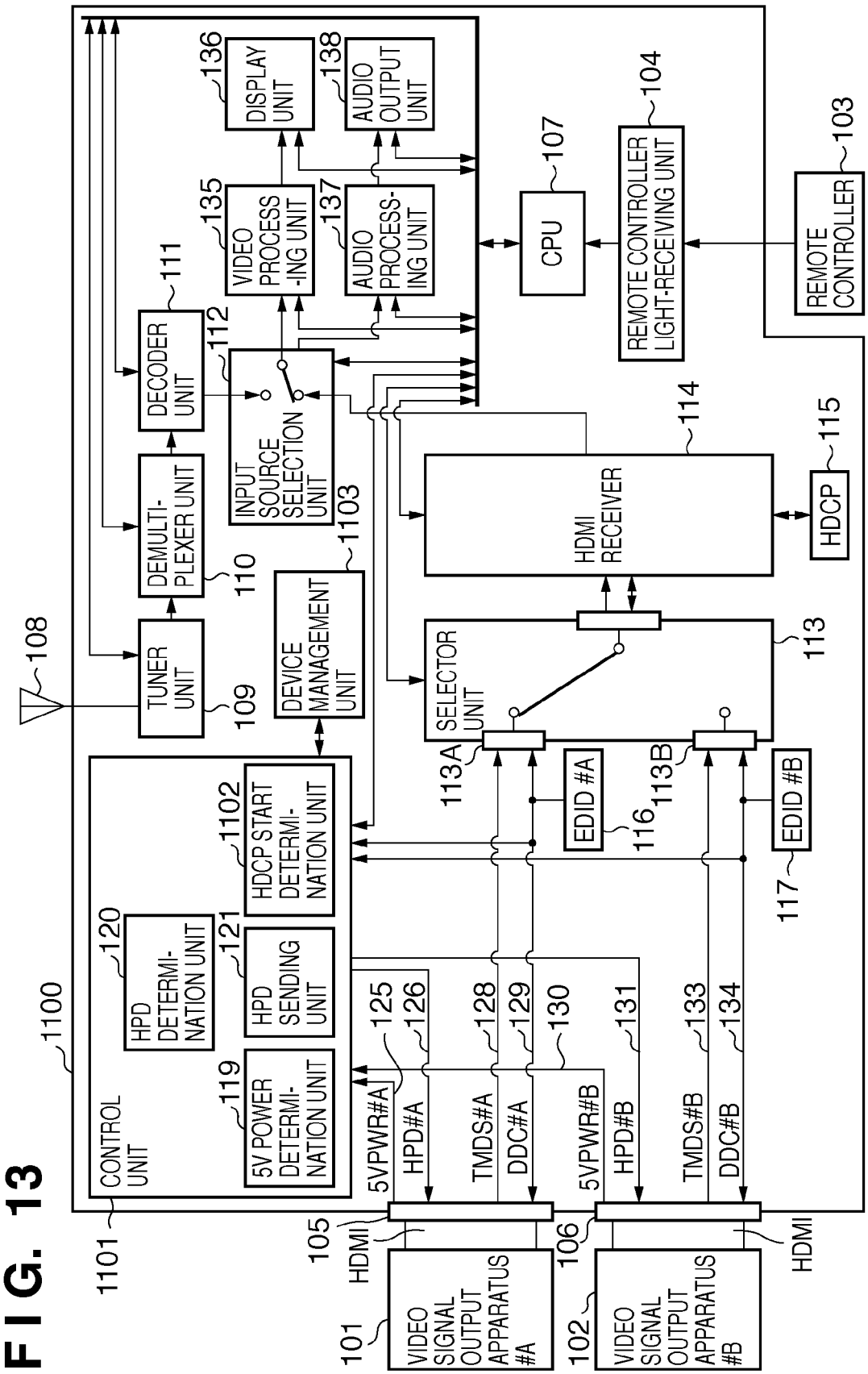
FIG. 13 is a block diagram illustrating an exemplary configuration of a television receiver that can be applied in a third embodiment.

FIG. 13 illustrates an exemplary configuration of a television receiver 1100 that can be applied in the third embodiment. Note that in FIG. 13, portions that are the same as those in the above-described FIG. 2 are given the same reference numerals, and detailed descriptions thereof shall be omitted. A control unit 1101 corresponds to the control unit 118 shown in FIG. 2, and has the 5V power determination unit 119, the HPD determination unit 120, and the HPD sending unit 121. In addition to that, the control unit 1101 has an HDCP authentication start determination unit 1102, serving as an authentication necessity information obtainment unit, which is a configuration unique to the present third embodiment. The HDCP authentication start determination unit 1102 monitors the Key Selection Vectors supplied over the DDC lines 129 and 134. The HDCP authentication start determination unit 1102 then determines whether or not HDCP authentication is necessary for the devices connected to the DDC lines 129 and 134.

To be more specific, the HDCP authentication start determination unit 1102 determines, when a Key Selection Vector has been received, that the device connected to the HDMI port that contains the DDC line over which the reception occurred requires HDCP authentication. Based on the result of this determination, the HDCP authentication start determination unit 1102 notifies a device management unit 1103 that the device connected to that HDMI port is a device that requires HDCP authentication, for that HDMI port.

Upon receiving that notification from the HDCP authentication start determination unit 1102, the device management unit 1103 stores the information contained in the received notification in the device management table as information of the device connected to the HDMI port. Note that the information stored in the device management table is held until the next time the 5V power line in that HDMI port moves to Low or the 5V power line in that HDMI port newly goes to High.

Figure 14:
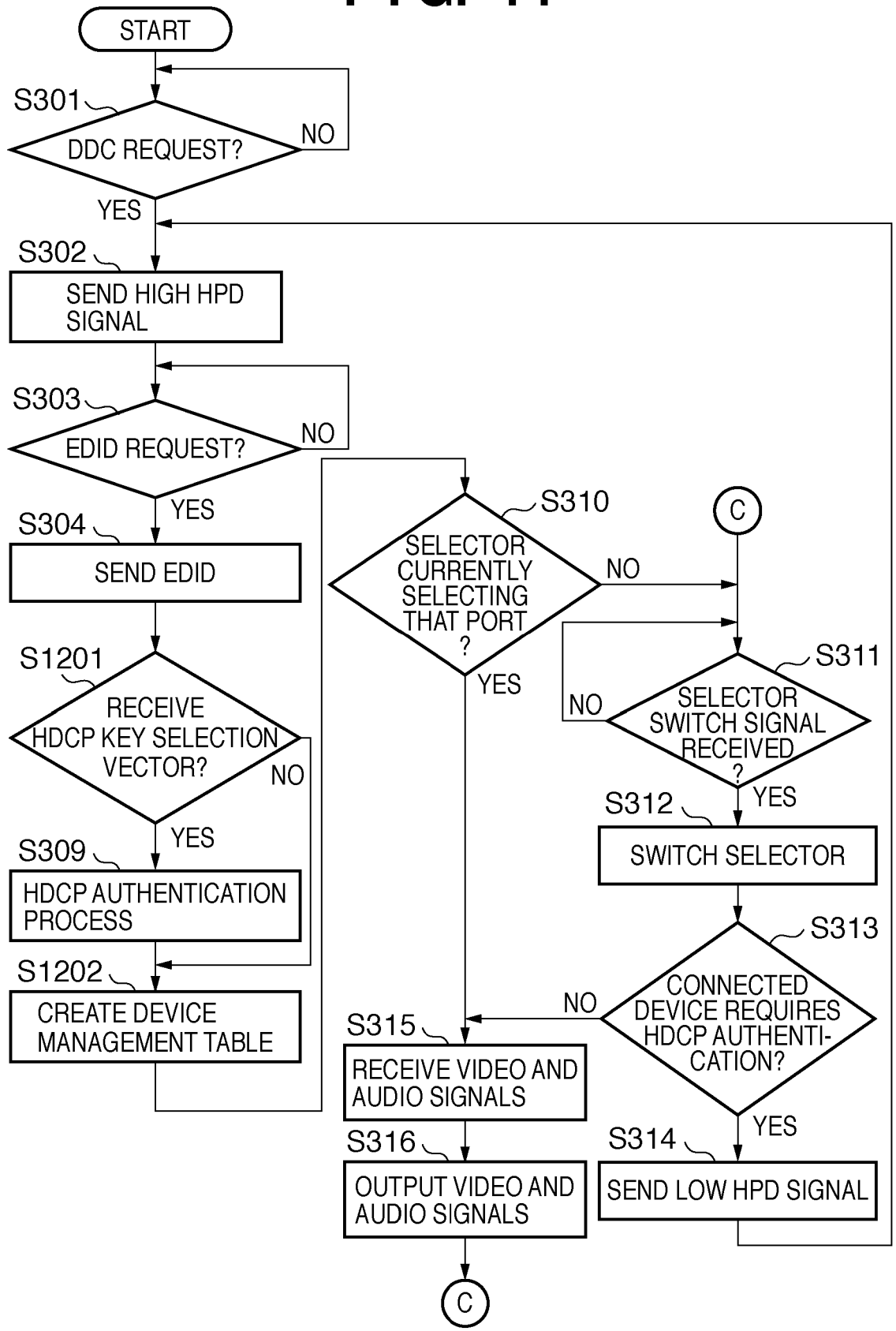
FIG. 14 is a flowchart illustrating an example of the processing performed in the third embodiment.

FIG. 14 is a flowchart illustrating an example of the processing performed in the third embodiment of the present invention. Note that in FIG. 14, portions that are the same as those in the above-described FIG. 3 are given the same reference numerals, and detailed descriptions thereof shall be omitted. First, the series of processes for sending the EDID to the video signal output apparatus 101 or 102 is performed in steps S301 to S304, after which the process moves to step S1201.

Note that unless otherwise mentioned, the video signal output apparatus 101, which requires HDCP authentication, is assumed hereinafter to be connected to the HDMI port 105. Of course, the following descriptions also apply if "video signal output apparatus 101" is replaced with "video signal output apparatus 102" and "HDMI port 105" is replaced with "HDMI port 106".

In step S1201, the HDCP authentication start determination unit 1102 in the television receiver 1100 stands by for a Key Selection Vector from the video signal output apparatus 101. However, if it is determined that a Key Selection Vector has not been received within a predetermined amount of time, the video signal output apparatus 101 is assumed to be a device that does not require HDCP authentication, and thus the process moves to step S1202. However, if a Key Selection Vector has been received within the predetermined amount of time, the process moves to step S309, where the HDCP authentication process is started.

Next, in step S1202, authentication necessity information indicating whether or not the video signal output apparatus 101 requires HDCP authentication is associated with the HDMI port 105 to which the video signal output apparatus 101 is connected, based on the result of the determination in step S1201. The authentication necessity information associated with this HDMI port 105 is stored in the device management table. In other words, in the present third embodiment, whether or not the video signal output apparatus requires HDCP authentication is determined based on whether or not a Key Selection Vector has been received.

Next, in step S310, it is determined whether or not the HDMI port 105, which is involved in determining whether the Key Selection Vector has been received in step S1201, is selected by the selector unit 113. If it has been determined that the HDMI port 105 is selected, the process moves to step S315.

However, if, in step S310, it is determined that the HDMI port 105 is not selected, the process moves to step S311, where the apparatus stands by for the reception of the selector switch signal. When the selector switch signal is received, the selectable input terminal is switched by the selector unit 113 in the following step S312, based on the received selector switch signal. In this example, the selector unit 113 switches from the selectable input terminal 113B to the selectable input terminal 113A, and the HDMI port 105 is selected as a result.

Next, the HPD determination unit 120 obtains the authentication necessity information of the video signal output apparatus 101 connected to the HDMI port 105 selected through the selectable input terminal 113A that has been switched to, the information being obtained from the device management table held by the device management unit 1103. Then, in the following step S313, it is determined whether or not the video signal output apparatus 101 connected to the HDMI port 105 requires HDCP authentication, based on the obtained authentication necessity information. If it has been determined that HDCP authentication is necessary, the process moves to step S314.

In step S314, the HPD sending unit 121 sends, for a predetermined amount of time (for example, 300 ms), a Low HPD signal to the video signal output apparatus connected to the HDMI port 105 that has been switched to.

When the sending of the HPD signal in step S314 is complete, the process returns to step S302. The HPD sending unit 121 then sends a High HPD signal to the video signal output apparatus 101 selected by the selector unit 113 in step S312. Through this, the video signal output apparatus 101 is once again notified that the DDC access preparation is complete, the communication initialization processing is executed once again, and the EDID request process and HDCP authentication process are carried out.

However, if, in the above-described step S313, it is determined based on the authentication necessity information in the device management table that the video signal output apparatus 101 does not require the HDCP authentication process, the process moves to step S315. In this case, it is not necessary to perform the DDC communication initialization processing, and the HPD signal is kept at High.

In step S315, the television receiver 100 receives the video data and audio data sent by the video signal output apparatus connected to the HDMI port currently selected by the selector unit 113. The video data and audio data are supplied to the HDMI receiver 114 through the HDMI port 105 or 106 and the selector unit 113. The HDMI receiver 114 then decrypts the video data and audio data, and supplies a video signal to the video processing unit 135 and an audio signal to the audio processing unit 137 via the input source selection unit 112.

Then, in step S316, the video processing unit 135 and audio processing unit 137 perform processes for outputting the supplied video data and audio data, respectively. The process then returns to step S311, where the selector switch signal enters a standby state.

It should be noted that like the above-described first and second embodiments, the present third embodiment can also be applied in the case where the video signal output apparatuses 101 and 102 are connected to the HDMI ports 105 and 106, respectively. In such a case, the television receiver 100 performs the processes of the above-described steps S301 to S309, S1201, and S1202 for both video signal output apparatuses connected to the HDMI ports 105 and 106. Through this, the device information of both video signal output apparatuses connected to the HDMI ports 105 and 106 can be obtained and device management tables created.

In this manner, according to the third embodiment of the present invention, the reception state of the Key Selection Vector is monitored, and whether or not the video signal output apparatus connected to the HDMI port requires HDCP authentication is managed and stored. Then, as in the above-described first and second embodiments, a process for resuming the DDC communication only when switching to a device that requires HDCP communication is carried out when the selector unit 113 performs a switch. It is therefore possible to reduce the amount of time required when switching to a device that does not require HDCP authentication.

<Fourth Embodiment>

Figure 15:
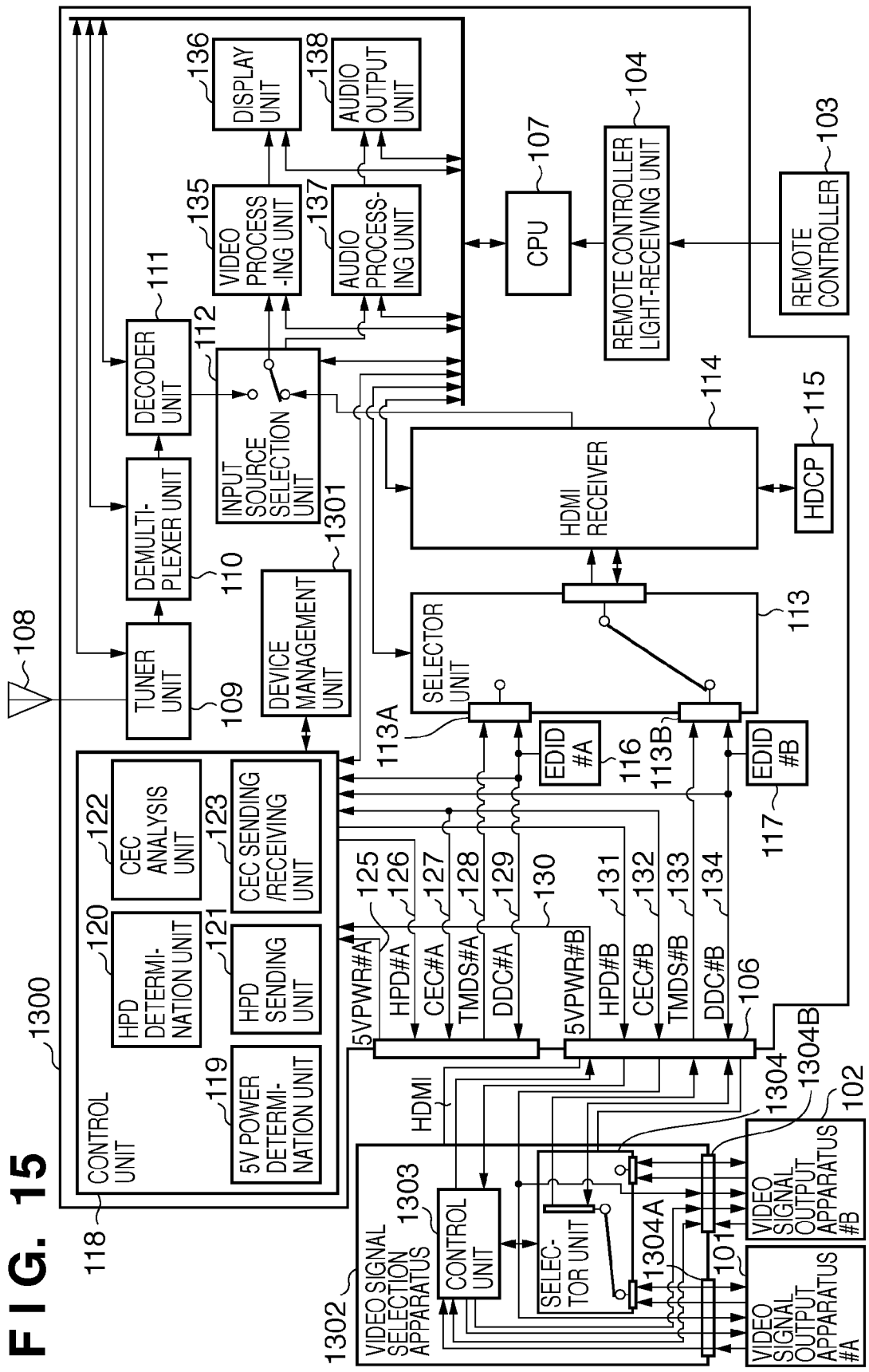
FIG. 15 is a block diagram illustrating an example of the configuration of a television receiver that can be applied in a fourth embodiment and an HDMI port connection format.

Next, processing according to a fourth embodiment of the present invention shall be described. FIG. 15 illustrates an example of the configuration of a television receiver 1300 that can be applied in the present fourth embodiment and an HDMI port connection format. Note that the same configuration as the television receiver 100 described using FIG. 2 can be applied to the television receiver 1300 shown in FIG. 15. In FIG. 15, elements common to those in FIG. 2 are given identical reference numerals, and detailed descriptions thereof shall be omitted.

In the example in FIG. 15, a video signal selection apparatus 1302 is connected to the HDMI port 106 of the television receiver 1300, which serves as a video control apparatus. The video signal selection apparatus 1302 has HDMI ports 1304A and 1304B, and the HDMI ports 1304A and 1304B can be switched in response to control performed by a control unit 1303. In other words, the television receiver 1300 is connected to the video signal output apparatus 101, which is connected to the HDMI port 1304A, and the video signal output apparatus 102, which is connected to the HDMI port 1304B, via the video signal selection apparatus 1302.

The video signal selection apparatus 1302 is a repeater apparatus such as an AV amplifier. The video signal selection apparatus 1302 controls a selector unit 1304 based on a selector switch signal output by the control unit 1303, thereby switching between the HDMI ports 1304A and 1304B and thus changing the connection to the television receiver 1300. Through this, the selector unit 1304 selects the video data and audio data to be sent to the television receiver 1300.

The 5V power line 130 and the HPD line 131 are connected to the HDMI ports 1304A and 1304B via the control unit 1303 within the video signal selection apparatus 1302. The CEC line 132 is directly connected to the HDMI ports 1304A and 1304B. Meanwhile, the TMDS line 133 and DDC line 134 are connected to the HDMI port 1304A or the HDMI port 1304B via the selector unit 1304.

Finally, although not shown in FIG. 15, the video signal selection apparatus 1302 has EDID ROMs for both the HDMI ports 1304A and 1304B, and has an HDCP ROM for the common terminal in the selector unit 1304.

The device management unit 1301 in the television receiver 1300 corresponds to the device management unit 124 shown in FIG. 2. The device management unit 1301 stores information of the HDMI ports that can be selected by the video signal selection apparatus 1302, which is a configuration unique to the present fourth embodiment, and also stores the authentication necessity information of the video signal output apparatuses 101 and 102 connected to the video signal selection apparatus 1302.

After being connected to the television receiver 1300, the video signal selection apparatus 1302 performs predetermined operations with the television receiver 1300 as already described, such as the DDC request, EDID request, EDID reception, and so on, through which the physical address is defined. When the physical address is defined, the video signal selection apparatus 1302 uses a CEC command to send device information containing information indicating the selected HDMI port to the television receiver 1300.

After this, of the video signal output apparatuses 101 and 102 connected to the video signal selection apparatus 1302, the device that is selected by the video signal selection apparatus 1302 performs the stated operations with the television receiver 1300, via the video signal selection apparatus 1302.

Furthermore, when the video signal output apparatus is connected to the HDMI port 1304A or 1304B of the video signal selection apparatus 1302, predetermined operations specified by HDMI are carried out between that video signal output apparatus and the video signal selection apparatus 1302. For example, the processes regarding the EDID as described in steps S301 to S304 in the flowchart of FIG. 3 are performed and the physical address defined. Upon having a physical address defined, the video signal output apparatus can send, via the video signal selection apparatus 1302, a CEC command containing device information to the television receiver 1300 over the CEC line.

Then, upon receiving the CEC command sent by the video signal selection apparatus 1302 or the video signal output apparatus 101 and/or 102 connected to the video signal selection apparatus 1302, the television receiver 1300 analyzes the received command using the CEC analysis unit 122. The device information extracted from the CEC command as a result of the analysis is stored in the device management table within the device management unit 1301.

In addition, the HDCP authentication process described in steps S308 and S309 in FIG. 3 is performed between the video signal selection apparatus 1302 and the video signal output apparatuses. The video signal selection apparatus 1302 performs the HDCP authentication process with the television receiver 1300 for, for example, an apparatus that has been authenticated through the authentication process when connected to the television receiver 1300.

The television receiver 1300 can be operated remotely using the remote controller 103, as mentioned above. For example, the television receiver 1300 can, in response to an operation made through the remote controller 103, display a list of devices connected to the HDMI ports 105 and 106 using the device management information described above in the first embodiment. At this time, when another HDMI port is provided in an apparatus connected to an HDMI port in the television receiver 1300, as is the case with the video signal selection apparatus 1302 described above, the device connected to that HDMI port is also displayed in the list.

By operating the remote controller 103 and selecting a device from the displayed list, a user can cause video and audio, based on the video data and audio data output from the selected device, to be output from the television receiver 1300. In other words, the selector unit 113 of the television receiver 1300 and the selector unit 1304 of the video signal selection apparatus 1302 are controlled, in response to a selection operation performed using the remote controller 103, so that the output of the selected device is supplied to the television receiver 1300. The selector unit 1304 of the video signal selection apparatus 1302 is controlled by CEC commands generated by the control unit 118 in response to operations made through the remote controller 103.

Video data and audio data output by the video signal output apparatus selected in the television receiver 1300 is supplied to the television receiver 1300 via the video signal selection apparatus 1302 and output through the display unit, speaker, or the like of the television receiver 1300.

FIG. 16 is a diagram illustrating an example of a device management table according to the present fourth embodiment. The device management table associates device information such as the physical address, logical address, vendor ID, and device type with authentication necessity information, and stores this associated information for each connection port. In addition, information of the HDMI ports 1304A and 1304B of the video signal selection apparatus 1302 is stored in the case where the video signal selection apparatus 1302 is connected.

The example shown in FIG. 16 indicates that three devices are connected to the HDMI port #B. Based on the physical addresses, it can be seen that the first device is connected directly to the HDMI port #B, whereas the second and third devices are connected to the HDMI port #B via the first device. Furthermore, the second device requires HDCP authentication, whereas the third device does not.

Figure 17:
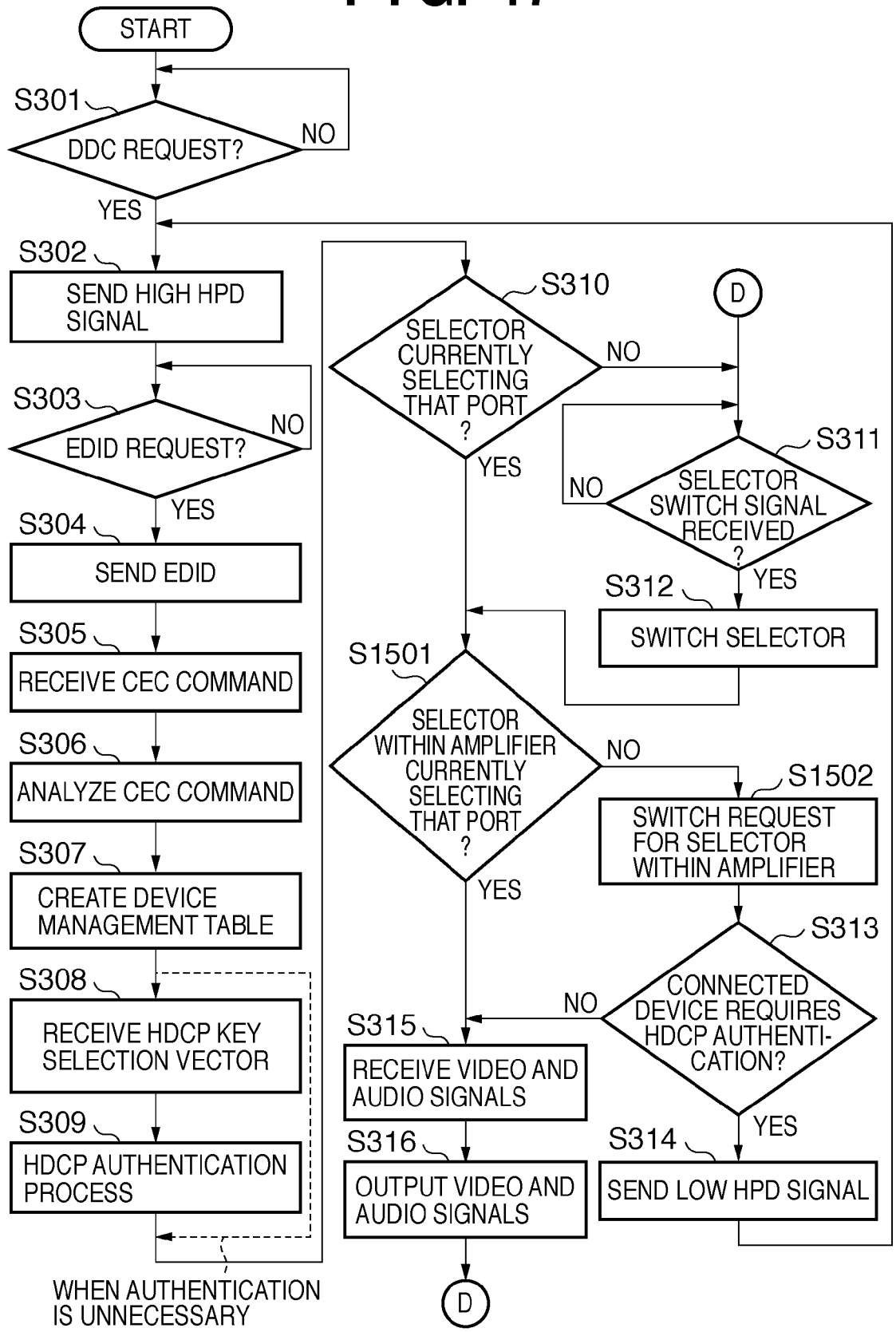
FIG. 17 is a flowchart illustrating an example of the processing performed in the fourth embodiment.

FIG. 17 is a flowchart illustrating an example of the processing performed in the fourth embodiment of the present invention. Note that in FIG. 17, portions that are the same as those in the above-described FIG. 3 are given the same reference numerals, and detailed descriptions thereof shall be omitted.

Prior to the processing shown in FIG. 17, the physical address definitions, HDCP authentication processes, and so on are performed between the video signal selection apparatus 1302 and the video signal output apparatuses 101 and 102 connected to the video signal selection apparatus 1302, through predetermined operations such as those described above. It is also assumed that in the initial state, the selector unit 1304 in the video signal selection apparatus 1302 is currently selecting the HDMI port 1304A, to which the video signal output apparatus 101 is connected.

In steps S301 to S304, the television receiver 1300 sends the EDID to the video signal selection apparatus 1302. The sent EDID is received by the video signal output apparatus connected to the HDMI port selected by the selector unit 1304 of the video signal selection apparatus 1302. Upon receiving the EDID, that video signal output apparatus sends a CEC command to the television receiver 1300. Information indicating the current state of the selection made by the selector unit 1304 is also sent by the video signal selection apparatus 1302 via a CEC command. These CEC commands are then received by the television receiver 1300 via the video signal selection apparatus 1302 (step S305).

The television receiver 1300 analyzes the received CEC command and creates a device management table (steps S306 and S307). This device management table stores device information regarding the video signal selection apparatus 1302 and the video signal output apparatus 101 and/or 102 connected to the video signal selection apparatus 1302, as described using FIG. 16. The stated information indicating the current state of the selection made by the selector unit 1304 may be stored in the device management table, or may be held separately.

In addition, the video signal output apparatus 101 selected by the selector unit 1304 sends a Key Selection Vector to the television receiver 1300 after receiving the EDID, and attempts HDCP authentication. When the Key Selection Vector is received by the television receiver 1300, the HDCP authentication process is carried out (steps S308 and S309).

Next, in step S310, it is determined whether or not the HDMI port that is involved in the sending of the Key Selection Vector in step S308 (the HDMI port 106, in the example shown in FIG. 15) is selected by the selector unit 113. If it has been determined that that HDMI port is selected, the process moves to step S1501.

Note that for devices that do not require HDCP authentication, the processes of steps S308 and S309 described above are not carried out, and the processing moves directly from the stated step S307 to step S310. For example, referring to the stated device information table shown in FIG. 16, the device connected to the HDMI port #B and whose physical address is [2.2.0.0] does not require HDCP authentication processing. Therefore, when the above-described process, starting with step S301, is carried out in response to a DDC request from this device, the process moves directly to step S310 after the device management table is created in step S307.

However, if, in step S310, it is determined that the HDMI port involved in the sending of the Key Selection Vector is not selected, the process moves to step S311, where the apparatus stands by for a selector switch signal.

When, in step S311, the selector switch signal is received, the selectable input terminal is switched by the selector unit 113 in step S312, in response to the received selector switch signal. In this example, the selector unit 113 switches from the selectable input terminal 113A to the selectable input terminal 113B, and the HDMI port 106 is selected as a result. When the selector unit 113 switch is performed, the process moves to step S1501.

Note that in the present fourth embodiment, the selector switch signal contains a switch instruction for the selector unit 113 of the television receiver 1300 and a switch instruction for the selector unit 1304 of the video signal selection apparatus 1302. In other words, the television receiver 1300 can control the selector unit 1304 of the video signal selection apparatus 1302 using a CEC command. For example, the physical address of the video signal output apparatus connected to the video signal selection apparatus 1302 is obtained by referring to the device management table created in step S307, and a switch instruction for the selector unit 1304 is sent to the video signal selection apparatus 1302.

In step S1501, the television receiver 1300 determines whether or not the HDMI port involved in the sending of the Key Selection Vector in step S308 is selected by the selector unit 1304 within the video signal selection apparatus 1302. In this example, it is determined whether or not the HDMI port 1304A is selected by the selector unit 1304. If it has been determined that the HDMI port 1304A is selected, the process moves to step S315. However, if it has been determined that that HDMI port is not selected, the process moves to step S1502.

In step S1502, the television receiver 1300 sends, to the video signal selection apparatus 1302, a CEC command for switching the selector unit 1304 so as to select that HDMI port. In this example, a CEC command for switching the selector unit 1304 to the HDMI port 1304A is sent. When the CEC command is sent, the process moves to step S313.

In step S313, it is determined whether or not the video signal output apparatus connected to the HDMI port switched to in the video signal selection apparatus 1302 requires HDCP authentication processing. In other words, the HPD determination unit 120 obtains the authentication necessity information in the device management table held by the device management unit 1301 for the video signal output apparatus 101 connected to the HDMI port 1304A. Then, it is determined whether or not that video signal output apparatus 101 requires HDCP authentication, based on the obtained authentication necessity information. If it has been determined that HDCP authentication is necessary, the process moves to step S314.

In step S314, the HPD sending unit 121 sends, for a predetermined amount of time (for example, 300 ms), a Low HPD signal to the video signal output apparatus determined in step S313 to require HDCP authentication. The process then returns to step S302, where a High HPD signal is sent by the HPD sending unit 121. This HPD signal is sent to that video signal output apparatus via the control unit 1303 of the video signal selection apparatus 1302. Through this, a notification is made indicating that the DDC access preparation is complete, and communication initialization processing is executed.

However, if, in the above-described step S313, it is determined based on the authentication necessity information in the device management table that the video signal output apparatus 101 does not require the HDCP authentication process, the process moves to step S315. In this case, it is not necessary to perform the DDC communication initialization processing, and the HPD signal is kept at High.

In step S315, the television receiver 1300 receives the video data and audio data through the HDMI port currently selected by the selector unit 113. In this example, the video data and audio data is sent by the video signal output apparatus 101 and is received by the television receiver 1300 via the video signal selection apparatus 1302. The received video data and audio data are supplied to the HDMI receiver 114 via the selector unit 113. The HDMI receiver 114 then decrypts this video data and audio data, and supplies a video signal to the video processing unit 135 and an audio signal to the audio processing unit 137 via the input source selection unit 112.

Then, in step S316, the video processing unit 135 and audio processing unit 137 perform processes for outputting the supplied video data and audio data, respectively. The process then returns to step S311, where the apparatus enters a standby state for the selector switch signal.

Thus, according to the fourth embodiment of the present invention, the television receiver 1300 stores the status of the selector unit 1304 of the video signal selection apparatus 1302 connected to the HDMI port. In addition, the television receiver 1300 stores the authentication necessity information of the video signal output apparatus connected to the HDMI port of the video signal selection apparatus 1302. Then, as in the above-described first and second embodiments, a process for resuming the DDC communication is carried out only when the selector unit 113 and the selector unit 1304 of the video signal selection apparatus 1302 switch to a device that requires HDCP communication. It is therefore possible to reduce the amount of time required when switching to a device that does not require HDCP authentication.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application Nos. 2008-208737 filed Aug. 13, 2008 and 2009-128061 filed May 27, 2009, which are hereby incorporated by reference herein in their entirety.

The invention claimed is:

1. A control apparatus comprising:
a sending unit that sends a predetermined signal to an external apparatus;
a receiving unit that receives video data;
a memory that stores authentication information, wherein the authentication information is used for decrypting encryption of video data received by the receiving unit; and
a control unit that (a) detects, based on an operation mode of the external apparatus, whether or not the external apparatus needs to obtain the authentication information, if a device type of the external apparatus is a predetermined type, (b) detects that the external apparatus needs to obtain the authentication information independent of the operation mode of the external apparatus, if the device type of the external apparatus is not the predetermined type, (c) performs control for changing a state of the predetermined signal to cause the external apparatus to obtain the authentication information, if the external apparatus needs to obtain the authentication information, and (d) causes a display unit to display video data received by the receiving unit without authenticating, using the authentication information, with the external apparatus, if the external apparatus does not need to obtain the authentication information.

2. The control apparatus according to claim 1, wherein the control unit performs an authentication process for authenticating, using the authentication information, with the external apparatus, if the external apparatus needs to obtain the authentication information, and the control unit causes the display unit to display video data received by the receiving unit after the authentication process is performed, if the external apparatus needs to obtain the authentication information.

3. The control apparatus according to claim 1, wherein the predetermined signal is a HPD (Hot Plug Detect) signal.

4. The control apparatus according to claim 1, wherein the authentication information includes information relating to HDCP (High-bandwidth Digital Content Protection).

5. The control apparatus according to claim 1, wherein the predetermined type is a recorder.

6. The control apparatus according to claim 1, wherein the predetermined type is a type that is different from a player.

7. The control apparatus according to claim 1, wherein the predetermined type is a type that is different from an audio system.

8. The control apparatus according to claim 1, wherein the control unit detects, based on whether the operation mode of the external apparatus is a mode for transmitting a broadcast content, whether or not the external apparatus needs to obtain the authentication information, if the device type of the external apparatus is the predetermined type.

9. The control apparatus according to claim 1, wherein the control unit detects that the external apparatus needs to obtain the authentication information, if the operation mode of the external apparatus is a mode for transmitting the broadcast content and the device type of the external apparatus is the predetermined type, and the control unit detects that the external apparatus does not need to obtain the authentication information, if the operation mode of the external apparatus is not the mode for transmitting the broadcast content and the device type of the external apparatus is the predetermined type.

10. A control method comprising:
sending a predetermined signal to an external apparatus;
detecting, based on an operation mode of the external apparatus, whether or not the external apparatus needs to obtain authentication information from a control apparatus, if a device type of the external apparatus is a predetermined type, wherein the authentication information is used for decrypting encryption of video data;
detecting that the external apparatus needs to obtain authentication information from the control apparatus independent of the operation mode of the external apparatus, if the device type of the external apparatus is not the predetermined type;
performing control for changing a state of the predetermined signal to cause the external apparatus to obtain the authentication information if the external apparatus needs to obtain the authentication information; and
causing a display unit to display video data received from the external apparatus without authenticating, using the authentication information, with the external apparatus, if the external apparatus does not need to obtain the authentication information.

11. The control method according to claim 10, wherein the predetermined type is a recorder.

12. The control method according to claim 10, wherein the predetermined type is a type that is different from a player.

13. The control method according to claim 10, wherein the predetermined type is a type that is different from an audio system.

14. The control method according to claim 10, further comprising
detecting, based on whether the operation mode of the external apparatus is a mode for transmitting a broadcast content, whether or not the external apparatus needs to obtain the authentication information, if the device type of the external apparatus is the predetermined type.

15. The control method according to claim 10, further comprising
detecting that the external apparatus needs to obtain the authentication information, if the operation mode of the external apparatus is a mode for transmitting the broadcast content and the device type of the external apparatus is the predetermined type; and
detecting that the external apparatus does not need to obtain the authentication information, if the operation mode of the external apparatus is not the mode for transmitting the broadcast content and the device type of the external apparatus is the predetermined type.

16. A non-transitory computer-readable storage medium storing a program executed by a computer, wherein the program causes the computer to perform a method, the method comprising:
sending a predetermined signal to an external apparatus;
detecting, based on an operation mode of the external apparatus, whether or not the external apparatus needs to obtain authentication information from a control apparatus, if a device type of the external apparatus is a predetermined type, wherein the authentication information is used for decrypting encryption of video data;
detecting that the external apparatus needs to obtain authentication information from the control apparatus independent of the operation mode of the external apparatus, if the device type of the external apparatus is not the predetermined type;
performing control for changing a state of the predetermined signal to cause the external apparatus to obtain the authentication information, if the external apparatus needs to obtain the authentication information; and
causing a display unit to display video data received from the external apparatus without authenticating, using the authentication information, with the external apparatus if the external apparatus does not need to obtain the authentication information.

* * * * *